United States Patent
Banno

(10) Patent No.: US 7,113,463 B2
(45) Date of Patent: Sep. 26, 2006

(54) OPTICAL DISK DEVICE CONTROLLING A REVOLUTION OF A RECORDABLE OPTICAL DISK ACCORDING TO A DISPLACEMENT BETWEEN A PHASE OF A SECTOR SYNCHRONIZING SIGNAL GENERATED FROM A DATA-WRITING REFERENCE CLOCK SIGNAL AND A PHASE OF A SYNCHRONIZING SIGNAL OBTAINED FROM ADDRESS

(75) Inventor: Masahiko Banno, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 534 days.

(21) Appl. No.: 10/670,821

(22) Filed: Sep. 24, 2003

(65) Prior Publication Data

US 2004/0057360 A1 Mar. 25, 2004

Related U.S. Application Data

(63) Continuation of application No. 09/918,914, filed on Jul. 31, 2001, now Pat. No. 6,650,606.

(30) Foreign Application Priority Data

Aug. 4, 2000 (JP) ............................. 2000-236898

(51) Int. Cl.
G11B 7/00 (2006.01)

(52) U.S. Cl. ................. 369/47.48; 369/47.28; 369/59.1; 369/59.2

(58) Field of Classification Search ............... None
See application file for complete search history.

(56) References Cited

U.S. PATENT DOCUMENTS

| 5,526,339 A | 6/1996 | Shimada |
| 6,529,456 B1 | 3/2003 | Kuodo et al. |

FOREIGN PATENT DOCUMENTS

| JP | 10049990 | 2/1998 |

*Primary Examiner*—Muhammad Edun
(74) *Attorney, Agent, or Firm*—Cooper & Dunham LLP

(57) ABSTRACT

An optical disk device that records and reproduces information on/from a recordable optical disk is provided. The optical disk device comprises a reference clock signal generating unit generating a data-writing reference clock signal used to obtain a data-writing timing upon recording data to the optical disk, a synchronizing signal generating unit generating a predetermined sector synchronizing signal from the data-writing reference clock signal, a data demodulating unit reading address information indicating a position on the optical disk from data recorded on the optical disk so as to demodulate the address information into a predetermined synchronizing signal, a displacement detecting unit detecting a displacement between a phase of the sector synchronizing signal and a phase of the synchronizing signal; and a data-writing control unit controlling a data-writing upon performing an additional recording to the optical disk by controlling a revolution of the optical disk dynamically according to the displacement.

14 Claims, 13 Drawing Sheets

OPTICAL DISK DEVICE CONTROLLING A REVOLUTION OF A RECORDABLE OPTICAL DISK ACCORDING TO A DISPLACEMENT BETWEEN A PHASE OF A SECTOR SYNCHRONIZING SIGNAL GENERATED FROM A DATA-WRITING REFERENCE CLOCK SIGNAL AND A PHASE OF A SYNCHRONIZING SIGNAL OBTAINED FROM ADDRESS

This is a Rule 1.53(b) continuation and claims the benefit of priority, of application Ser. No. 09/918,914 filed Jul. 31, 2001 now U.S. Pat. No. 6,650,606.

BACKGROUND OF THE INVENTION

1. Field of the Invention

The present invention generally relates to an optical disk device which records and reproduces information to/from a writable optical disk, and more particularly, to a technology for preventing the occurrence of a buffer-underrun during a data-recording.

2. Description of the Related Art

A writable optical disk has a relatively large unit into which to write data due to characteristics of a recording format. Many of conventional optical disk devices do not cause a data-recording to an optical disk to pause. Therefore, unless data is transmitted from a host computer to the optical disk device at a higher transfer rate than a recording speed of the optical disk device to the optical disk, the data-recording comes to be suspended. When the data-recording to the optical disk is suspended, the data-recording fails because the data cannot be written additionally.

This is called a buffer-underrun. As the recording speed to the optical disk becomes higher, the buffer-underrun is more likely to occur, and the resulting failure of the data-recording poses a serious problem for a user, because a CD-R is a write once type, in which a failure of a data-recording means a loss of an optical disk and a loss of the data already written or to be written.

A method has been contrived for preventing such a buffer-underrun: increasing a capacity of a buffer RAM provided in an optical disk device for temporarily storing data from a host computer so as to absorb the change in a data transfer speed from the host computer during a data-recording. However, increasing the capacity of the buffer RAM is not a good measure, because increasing the capacity of the buffer RAM leads to raising a cost of the optical disk device as a whole. Additionally, the buffer RAM cannot deal with all cases related to the differences in a throughput of host computers.

Another method contrived is detecting in advance that a buffer-underrun is near to occur so as to change the data-recording speed to an optical disk. However, this method involves a complicated structure and control, because the data-recording speed needs to be switched during a data-recording to the optical disk.

Thereupon, Japanese Laid-Open Patent Application No. 10-49990 discloses an invention which can prevent a buffer-underrun beforehand regardless of a change in a data transfer speed from a host computer by comprising a means for temporarily stopping a data-recording during the data-recording to an optical disk, and a means for resuming the data-recording from a position at which the data-recording is stopped.

In other words, the Japanese Laid-Open Patent Application No. 10-49990 describes that, when a data-transfer from a host computer cannot keep up with a data-recording to an optical disk, the data-recording operation is temporarily stopped until the data-recording is resumed when a sufficient amount of data to perform a data-recording to the optical disk is secured after the data-transfer is resumed. In this arrangement, a displacement in the joint of the two recordings is made extremely small in terms of positional precision so that the data maintains a continuity by a CIRC demodulation, and an area including the joint can be reproduced without causing a serious problem in terms of data-reproduction. Further, as to a means for forming the above-mentioned precise joint, the invention disclosed in the Japanese Laid-Open Patent Application No. 10-49990 is characterized by comprising a means for accurately detecting an end of data recorded last time when resuming a data-recording, and a means for resuming the data-recording from the end of the data.

Such a recording control as disclosed in the Japanese Laid-Open Patent Application No. 10-49990 involves a possibility that a data-recording operation to an optical disk is frequently stopped and resumed. Normally, data transferred from a host computer is temporarily stored in a buffer RAM, and a predetermined parity, etc. is encoded and added to the data. Thereafter, the data is subjected to processes including an EFM modulation so as to be recorded as recorded data on an optical disk. Currently, in a conventional optical disk device, the capacity of the buffer RAM is approximately from 512 kilobytes (Kbytes) to 2 megabytes (Mbytes).

On the other hand, a recording speed to a CD, for example, is 150 Kbytes at a normal speed, and if a recording speed keeps being increased as it currently is, the recording speed becomes 2.4 Mbytes/sec at a sixteen-fold speed. Therefore, all the data temporarily stored in the buffer RAM is to be recorded on the optical disk in as short a time as approximately 0.8 seconds. Accordingly, unless new data is transmitted from the host computer in this short time and then a predetermined parity, etc. is encoded and added to the data, a buffer-underrun occurs in which the recording operation is temporarily stopped. Even though the capability of a host computer connected to an optical disk device is being improved, a possibility that a data-recording operation is frequently stopped and resumed has to be treated properly in order to guarantee a stable operation in association with any host computer.

However, when performing the above-mentioned control of detecting an ending position of the previous recording and accurately resuming the data-recording from the ending position, under the situation where a data-recording operation is frequently stopped and resumed, a displacement may occur between absolute time information (ATIP absolute time information) and a position of recorded data, and when the displacement actually occurs, the displacement is accumulated. When the accumulated displacement surpasses a certain value, the data-recording operation cannot be resumed. As mentioned above, the amount of data that is transferred from a host computer and can be retained in an optical disk device is equivalent to the capacity of a buffer RAM at most. Therefore, unless another data is transferred from the host computer within a period by the end of recording the data stored in the buffer RAM, the recording operation has to be temporarily stopped.

Further, if a change in revolution of a motor occurs during this period, and if the change cannot be absorbed in a motor revolution control, the ending position of the recording is displaced from the absolute position on the optical disk. Thereafter, upon resuming the recording, the displaced ending position of the previous recording is detected, and the data-recording is resumed from the displaced ending position. Accordingly, the displacement from the absolute position on the optical disk is accumulated. In a control of a recording position for resuming a data-recording as an example, a frame address of the aimed position is first detected by using ATIP absolute time information. Next, the ending position is predicted by switching from information obtained by reproducing data recorded on an optical disk to a sub-code frame synchronizing-signal.

In this control of determining a position for resuming a data-recording, when the above-mentioned accumulation of displacement surpasses one sub-code frame, the data-recording may be erroneously resumed from a position before the ending position of the previous recording. That is, an overlap occurs in the above-mentioned joint of the two recordings in some case, and, in other case, recorded information is reproduced while the recorded information keeps the displacement from the absolute position information on the optical disk. In both cases, there is a possibility that data may not be reproduced accurately. The seriousness of this problem depends on the number of times a data-recording operation is temporarily stopped and resumed which affects the accumulation of displacement, and also depends on a length of a period from a resumption of the data-recording operation until a stop thereof which affects the time to be taken for a motor revolution control to transit from an unstable state to a stable state. In other words, the above-mentioned possibility becomes greater as the capacity of the buffer RAM becomes smaller, and as the recording speed to the optical disk becomes higher.

SUMMARY OF THE INVENTION

It is a general object of the present invention to provide an improved and useful optical disk device in which the above-mentioned problems are eliminated.

A more specific object of the present invention is to provide an optical disk device which can provide a stable and optimal recording control by, upon resuming a data-recording to an optical disk device, detecting a displacement between the phase of an EFM frame sync signal obtained by reproducing data recorded last time and the phase of a sector synchronizing signal generated by a data-writing reference clock signal generating unit so as to be used to obtain a data-writing timing for recording data to the optical disk device.

In order to achieve the above-mentioned objects, there is provided according to one aspect of the present invention an optical disk device recording information on a recordable optical disk including address information indicating a position of a part of the optical disk having not recorded any data yet, and reproducing information from the optical disk, the device comprising:

a reference clock signal generating unit generating a data-writing reference clock signal used to obtain a data-writing timing upon recording data to the optical disk;

a synchronizing signal generating unit generating a predetermined sector synchronizing signal from the data-writing reference clock signal;

a data demodulating unit reading address information indicating a position on the optical disk from data recorded on the optical disk so as to demodulate the address information into a predetermined synchronizing signal;

a displacement detecting unit detecting a displacement between a phase of the sector synchronizing signal and a phase of the synchronizing signal; and a data-writing control unit controlling a data-writing upon performing an additional recording to the optical disk by controlling a revolution of the optical disk dynamically according to the displacement.

According to the present invention, an erroneous recording operation can be prevented beforehand. Specifically, a loss of an optical disk and a loss of data already written can be restricted to the minimum when a data-recording fails, and a displacement from an absolute position on the optical disk can be immediately corrected. Therefore, a data-recording operation to the optical disk can be frequently stopped and resumed. Consequently, this can reduce the memory capacity of a buffer memory used in data-recording, realizing an inexpensive, efficient and accurate recording control that can greatly reduce the cost of the optical disk device.

Additionally, in the optical disk device according to the present invention, the data-writing control unit may increase a servo response dynamically to a motor revolving the optical disk, when the displacement surpasses a predetermined value.

According to the present invention, when information is recorded at a position displaced from the absolute position on the optical disk, the displacement can be immediately corrected in the next recording so as to prevent the accumulation of the displacement.

Additionally, in the optical disk device according to the present invention, the data-writing control unit may increase a servo response dynamically to a motor revolving the optical disk, when the displacement surpasses the displacement detected last time by the displacement detecting unit.

According to the present invention, an accumulation of relative displacement from the last recording control can be detected, realizing an efficient, accurate and optimal recording control that can immediately correct the displacement from the absolute position on the optical disk.

Additionally, in the optical disk device according to the present invention, the data-writing control unit may decrease the increased servo response back to a previous degree thereof, when the displacement becomes lower than a predetermined reference value.

According to the present invention, an efficient and accurate recording control to the optical disk can be realized.

Additionally, in the optical disk device according to the present invention, the data-writing control unit may decrease the increased servo response back to a previous degree thereof, when a predetermined period has elapsed since the data-writing control unit increases the servo response.

Additionally, in the optical disk device according to the present invention, the data-writing control unit may decrease the increased servo response back to the previous degree thereof, when a predetermined amount of data has been recorded to the optical disk since the data-writing control unit increases the servo response.

According to the present invention, the servo response can be increased only when necessary, and a period during which the servo response is increased can be limited. This can avoid following noises and erroneous detection of address information indicating a position of a part of the optical disk having not recorded any data yet, which may otherwise result in an unstable motor revolution control, when increasing the servo response in a servo circuit; thus, a stable and optimal recording control can be realized.

In order to achieve the above-mentioned objects, there is also provided according to another aspect of the present invention an optical disk device recording information on a recordable optical disk including address information indicating a position of a part of the optical disk having not recorded any data yet, and reproducing information from the optical disk, the device comprising:

a reference clock signal generating unit generating a data-writing reference clock signal used to obtain a data-writing timing upon recording data to the optical disk;

a synchronizing signal generating unit generating a predetermined sector synchronizing signal from the data-writing reference clock signal;

a data demodulating unit reading address information indicating a position on the optical disk from data recorded on the optical disk so as to demodulate the address information into a predetermined synchronizing signal;

a displacement detecting unit detecting a displacement between a phase of the sector synchronizing signal and a phase of the synchronizing signal; and a data-writing control unit controlling a data-writing upon performing an additional recording to the optical disk by controlling a speed of writing data to the optical disk according to the displacement.

According to the present invention, a period during which to deal with one set of data transferred from outside can be lengthened, i.e., a period from the start of a recording to the end thereof can be lengthened. This lengthened period can increase the probability of absorbing (adjusting and stabilizing) the displacement so as to prevent the occurrence of a displacement beforehand. Therefore, a data-recording operation to the optical disk can be frequently stopped and resumed. Consequently, this can reduce the memory capacity of a buffer memory used in data-recording, realizing an inexpensive, efficient and accurate recording control that can greatly reduce the cost of the optical disk device.

Additionally, in the optical disk device according to the present invention, the data-writing control unit may cause the displacement detecting unit to perform the detecting again after decreasing the speed, when the displacement surpasses a predetermined value.

According to the present invention, a period from the start of a recording to the end thereof can be lengthened so as to increase the probability of absorbing the displacement, preventing the occurrence of a displacement beforehand more surely.

Additionally, in the optical disk device according to the present invention, the data-writing control unit may cause the displacement detecting unit to perform the detecting again after decreasing the speed, when the displacement surpasses the displacement detected last time by the displacement detecting unit.

According to the present invention, not only an accumulation of relative displacement from the previous recording control can be prevented, but also a period from the start of a recording to the end thereof can be lengthened so as to increase the probability of absorbing the displacement, preventing the occurrence of a displacement beforehand more surely.

Additionally, in the optical disk device according to the present invention, the data-writing control unit may start the additional recording to the optical disk, when the displacement becomes lower than a predetermined reference value.

According to the present invention, an efficient and accurate recording control to the optical disk can be realized.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Embodiment 1

Figure 1:
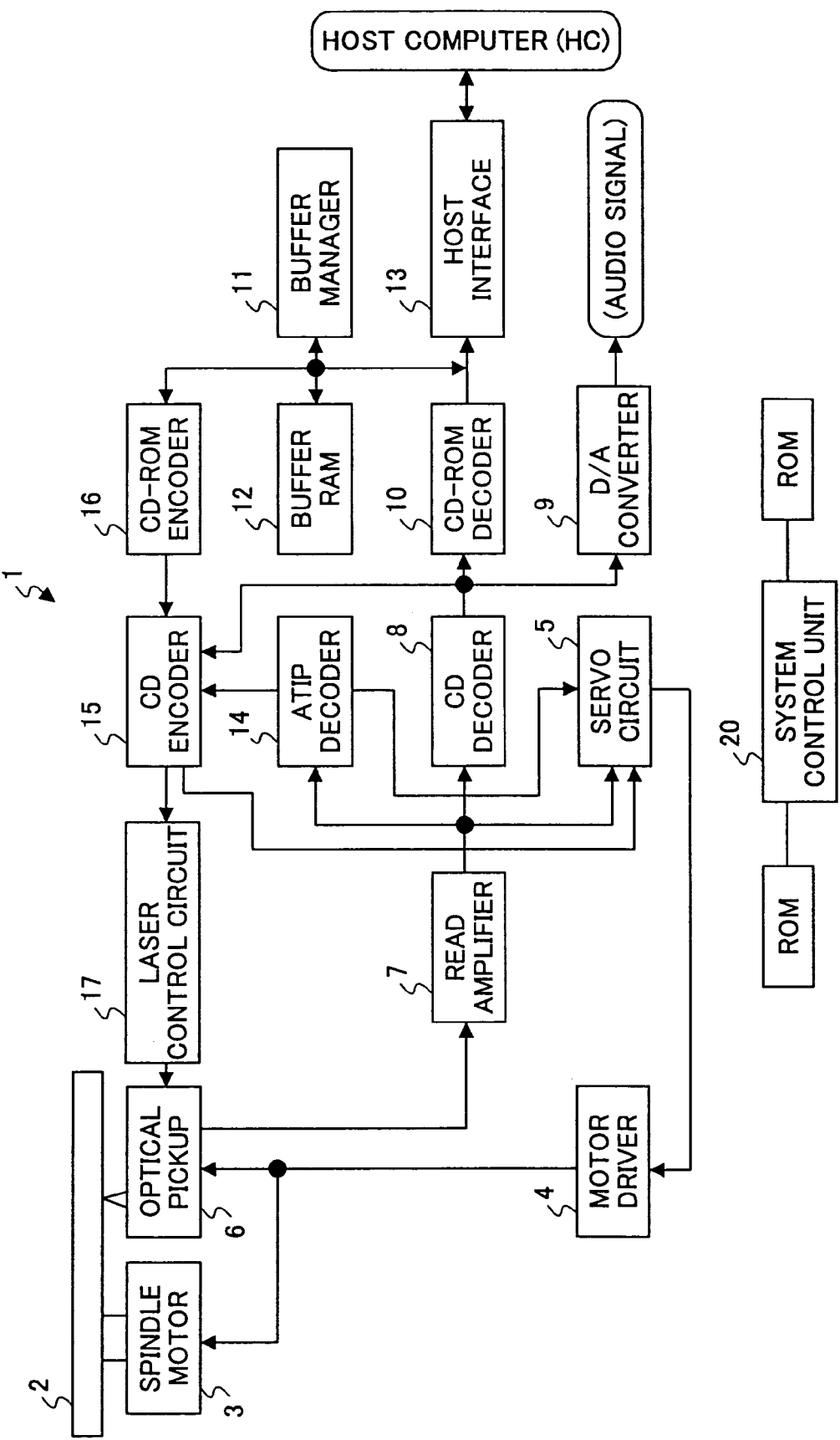
FIG. 1 is a block diagram outlining a structure of an optical disk device according to a first embodiment of the present invention.

FIG. 1 is a block diagram outlining an example of a structure of an optical disk device according to a first embodiment of the present invention, taking a CD-R as an example.

In an optical disk device 1 shown in FIG. 1, an optical disk 2 is revolved by a spindle motor 3. This spindle motor 3 is controlled by a motor driver 4 and a servo circuit (a data-writing control unit) 5 so that a linear velocity becomes constant. This linear velocity can be changed step by step.

An optical pickup 6 reading and writing data from/to the optical disk 2 includes a semiconductor laser, an optical system, a focus actuator, a track actuator, a light-receiving element, and a position sensor (not shown in the figure)

incorporated therein. The optical pickup 6 projects a laser beam upon the optical disk 2 so as to read and write data therefrom/thereto. Additionally, the optical pickup 6 can be moved toward a sledge by a seek motor (not shown in the figure). The above-mentioned focus actuator, the, track actuator and the seek motor are controlled by the motor driver 4 and the servo circuit 5 according to signals obtained from the light-receiving element and the position sensor so that a spot of the laser beam (LB) is positioned at an aimed position on the optical disk 2.

A data signal read by the optical pickup 6 is amplified by a read amplifier 7 into binary data. A CD decoder (a data demodulating unit) 8 decodes the amplified binary data by performing an EFM demodulation and a CIRC calculation (de-interleave, an error correction, etc.) thereto. Then, when the decoded data is audio data (hereinafter referred to as CD data), the decoded data is converted from D to A by a D/A converter 9 to be output as an audio signal.

When the decoded data is PC data (hereinafter referred to as CD-ROM data), the CD decoder 8 supplies the CD-ROM data to a CD-ROM decoder 10. The CD-ROM decoder 10 stores the supplied data in a buffer RAM 12 via a buffer manager 11 at any time, and performs an error correction to the stored data so as to further enhance the reliability of the data. In this course, the data stored in the buffer RAM 12 is read out via the buffer manager 11, and then after the error correction, the data is written back to the buffer RAM 12 via the buffer manager 11.

After completion of the error correction by the CD-ROM decoder 10, the data is read out via the buffer manager 11, and then is transferred to an external host computer (HC) via a host interface 13. The host interface 13 is an interface to the host computer HC, and is in conformity to such a standard as ATAPI or SCSI.

On the other hand, the optical disk 2 yet to record data has absolute time information (address information) called ATIP (Absolute Time In Pregroove) embedded in a manufacturing process. Upon writing data to a part of the optical disk 2 having not recorded any data yet, the optical pickup 6 reads out the ATIP data. Specifically, a wobble signal engraved in the optical disk 2 as by a wobbling track is read by the optical pickup 6, and is then amplified by the read amplifier 7 into binary data so as to be supplied to an ATIP decoder 14. The wobble signal includes the ATIP data, and the absolute time information is extracted from the ATIP data by the ATIP decoder 14.

The ATIP decoder 14 decodes the supplied ATIP data into a synchronizing signal (hereinafter referred to as an ASYNC signal) and the absolute time information (hereinafter referred to as ATIP time information), and then supplies the ASYNC signal and the ATIP time information to a CD encoder 15. Upon writing data to the part of the optical disk 2 having not recorded any data yet, the CD encoder 15 uses the supplied ATIP data as important information for detecting a write-in position on the optical disk 2. The CD encoder 15 enables a writing to start at an accurate position on the optical disk 2 by using the ASYNC signal and the ATIP time information.

As described above, with respect to the part of the optical disk 2 having not recorded any data yet, time information indicating a position on the optical disk 2 can be obtained only from the ATIP data. On the other hand, with respect to a part of the optical disk 2 having already recorded some data, the ATIP decoder 14 may not be able to generate an accurate ASYNC signal and ATIP time information on some occasions, due to a low quality of the wobble signal. However, sub-code data along with a sub-code sync which is a synchronizing signal are recorded in the part of the optical disk 2 having already recorded some data, and the CD decoder 8 supplies the CD encoder 15 with time information (address information) on the optical disk 2 obtained by demodulating the sub-code data. Thus, the CD encoder 15 may use the sub-code data upon writing data to the part of the optical disk 2 having already recorded some data. The CD encoder 15 uses the sub-code data together with the above-mentioned ATIP time information so as to obtain time information indicating a position on the optical disk.

Data to be written to the optical disk 2 is transferred from the host computer (HC) via the buffer manager 11 to the buffer RAM 12. A CD-ROM encoder 16 reads the data in the buffer RAM 12 via the buffer manager 11, adds error correction code, EDC code, SYNC code, header information and other information, and then writes the data to the buffer RAM 12.

The CD-ROM encoder 16 reads the data written in the buffer RAM 12 via the buffer manager 11, and then writes the data to a CIRC calculation RAM (not shown in the figure) in the CD encoder 15. The CD encoder 15 performs a CIRC calculation of adding error correction code and interleaving to the data in the CIRC calculation RAM, further performs an EFM modulation to the calculated data, and then outputs the modulated data. The data output from the CD encoder 15 is recorded in the optical disk 2 via a laser control circuit 17 and the optical pickup 6. It is noted that the (EFM) modulated data, as a bit stream, drives the laser at a channel bit rate of 4.3218 Mbps (a normal speed). In this case, the recorded data constitutes an EFM frame in 588 channel bits. Besides, a channel clock means a clock of a frequency of the channel bits.

Additionally, the wobble signal obtained from the optical disk 2 is supplied to the servo circuit 5 via the optical pickup 6 and the read amplifier 7, and a revolution control signal generated in the servo circuit 5 is supplied to the spindle motor 3 via the motor driver 4. It is noted that a CPU (a system control unit) 20 controls operations of the CD decoder 8, the CD-ROM decoder 10, the host interface 13, the ATIP decoder 14, the CD encoder 15, the CD-ROM encoder 16, and other elements.

Figure 2:
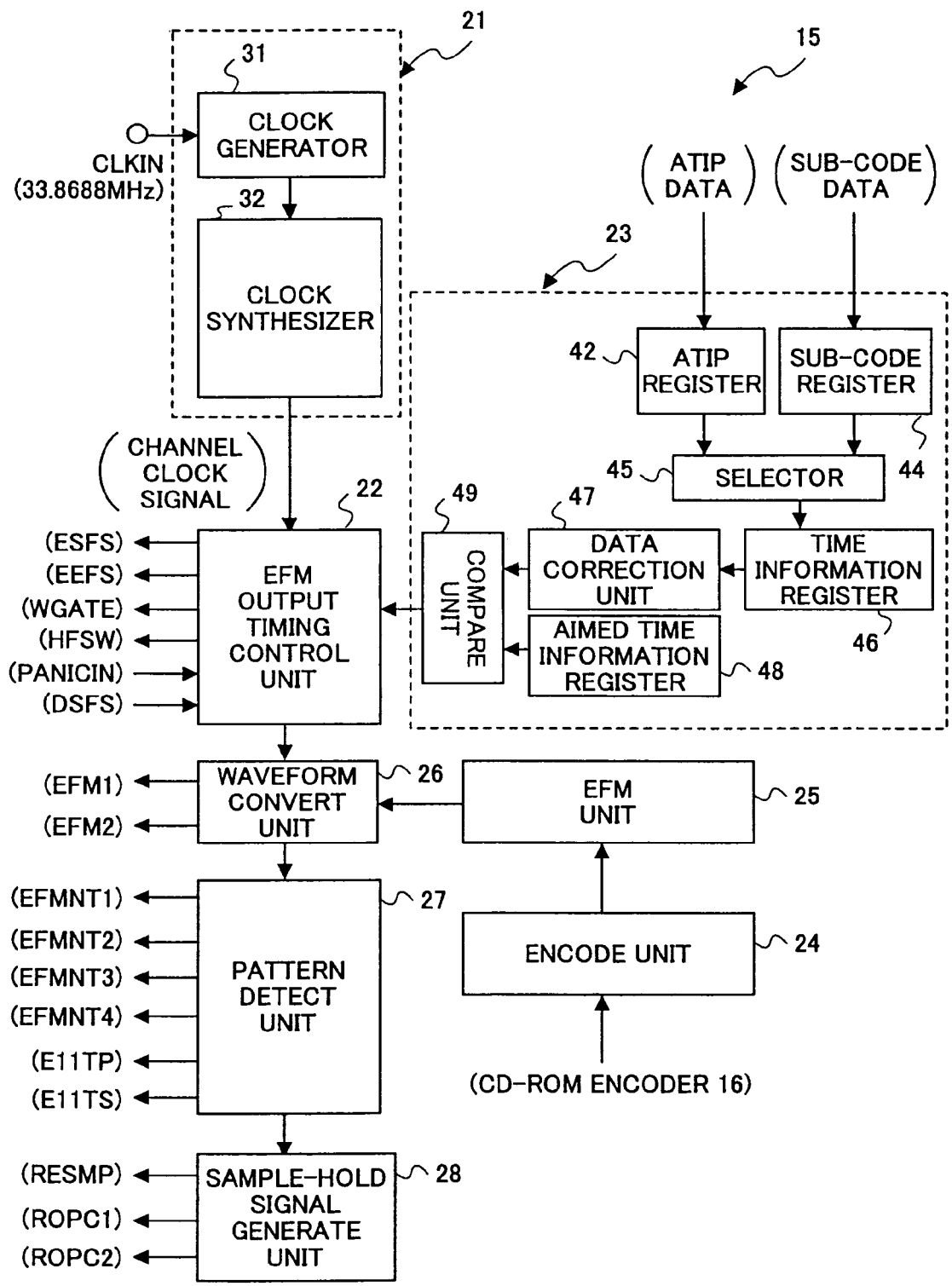
FIG. 2 is a block diagram outlining an example of a structure of a CD encoder shown in FIG. 1.

FIG. 2 is a block diagram outlining an example of a structure of the CD encoder 15. A further description will be given, with reference to FIG. 2, of operations of the CD encoder 15.

In FIG. 2, the CD encoder 15 comprises a clock signal generating unit 21, an EFM output timing control unit (a synchronizing signal generating unit) 22, and a time information judging unit 23. The clock signal generating unit 21 generates a channel clock signal from an externally supplied reference clock, and then supplies the channel clock signal, which is necessary in the CD encoder 15, to each unit therein. The EFM output timing control unit 22 generates and outputs various reference signals for controlling the laser control circuit 17. The time information judging unit 23 judges whether or not the time information obtained from the ATIP time information supplied from the ATIP decoder 14 or the time information obtained from the sub-code data supplied from the CD decoder 8 coincides with predetermined aimed time information.

The CD encoder 15 further comprises an encode unit 24, an EFM unit 25, a waveform convert unit 26, and a pattern detect unit 27. The encode unit 24 encodes the data to be written supplied from the CD-ROM encoder 16 in a predetermined manner. The EFM unit 25 performs an EFM process to the data encoded in the encode unit 24 so as to generate an EFM signal. The waveform convert unit 26 performs a waveform conversion, i.e., a so-called strategy conversion, to the EFM signal, and then supplies the converted signal to the laser control circuit 17. The pattern detect unit 27 detects a signal pattern required for a laser control from the signal converted in the waveform convert unit 26 so as to generate a laser control signal and supply the laser control signal to the laser control circuit 17. In addition, a sample-hold signal generate unit 28 generates a signal for sample-holding such a signal as a servo signal during data-writing.

The clock signal generating unit 21 comprises a clock generator 31 and a clock synthesizer 32. The clock generator 31 generates a predetermined clock signal from a reference clock of 33.8688 MHz, for example, supplied from externally to an input terminal CLKIN. The clock synthesizer 32 generates the channel clock signal, which is a reference clock in the CD encoder 15, from the clock signal generated in the clock generator 31, and then supplies the channel clock signal to each of the units in the CD encoder 15. The clock synthesizer 32 comprises PLL circuits and other elements.

The time information judging unit 23 comprises an ATIP register 42 and a sub-code register 44. The ATIP register 42 temporarily stores the ATIP time information. The sub-code register 44 temporarily stores the sub-code data supplied from the CD decoder 8. The time information judging unit 23 further comprises a selector 45, a time information register 46, and a data correction unit 47. The selector 45 selectively outputs either of the ATIP time information stored in the ATIP register 42 or the sub-code data stored in the sub-code register 44. The time information register 46 stores the data selected in the selector 45 as present time information. The data correction unit 47 corrects the data stored in the time information register 46 so as to generate an internal correction value.

Time has elapsed since the ATIP data and the sub-code data are read out by the optical pickup 6 until supplied to the CD encoder 15. In order to correct this time difference, the data correction unit 47 corrects the data stored in the time information register 46 into data indicating a time including a predetermined time.

The time information judging unit 23 still further comprises an aimed time information register 48 and a compare unit 49. The system control unit 20 writes time information supplied from the host computer (HC) upon data-writing to the aimed time information register 48, the time information indicating a write-in position. The compare unit 49 constantly compares the time indicated by the internal correction value generated in the data correction unit 47 with a time indicated by the time information stored in the aimed time information register 48 so as to generate a control signal required for an EFM output timing control according to the comparison result and supply the control signal to the EFM output timing control unit 22.

The data stored in the ATIP register 42 is then stored in the time information register 46 via the selector 45. The data correction unit 47 reads out the time information stored in the time information register 46, and then generates the internal correction value with respect to the time information and supplies the internal correction value to the compare unit 49. The compare unit 49 compares the internal correction value supplied from the data correction unit 47 with the time information supplied from the aimed time information register 48 so as to supply the EFM output timing control unit 22 with the control signal according to the comparison result.

When the time information supplied from the data correction unit 47 coincides with the time information supplied from the aimed time information register 48, the EFM output timing control unit 22 generates and outputs various timing signals required for data-writing, such as an ESFS (Encode Subcode Frame Sync) signal (a sector synchronizing signal) which is a reference synchronizing signal synchronous with the above-mentioned channel clock signal and an EEFS (Encode EFM Frame Sync) signal which is an EFM frame sync signal, so that data-writing is performed to the optical disk 2.

Here, a description will be given of a recording format of data to be written to the optical disk 2.

In a CD mode, data per second is divided into 1/75-second units so as to form each block. In a CD-ROM mode, the above-mentioned one block forms one sector. Since the CD data has four bytes (16 bits×stereo) per sampling clock of 44.1 kHz, the amount of data per block is (44100/75)× 4=2352 bytes. When the data is actually recorded to a CD, the data is divided into 24-byte frames. That is, one block has 2352/24=98 frames.

Then, since an 8-byte error correction code called CIRC and sub-code data that is one-byte control data are added to each 24-byte frame data, one frame comes to have 33 bytes. Each one byte of the one frame undergoes an EFM modulation, and margin bits of three bits are added thereto. Further, a frame sync pattern (SyncHeader) which is a 24-bit synchronizing pattern indicating a break between frames, and margin bits of three bits are added to each one frame. In all, one-frame data comes to have 33×(14+3)+(24+3)=588 bits (a channel clock), and is referred to as one EFM frame.

In the sub-code data, 98 bytes form one block, and the first 2 bytes of each block are sub-code sync patterns S0 and S1. The above-mentioned ESFS signal is a signal that indicates a timing of writing the sub-code sync pattern S0 having undergone an EFM modulation. The EEFS signal is a signal that indicates a timing of writing the frame sync pattern having undergone an EFM modulation. In other words, the EEFS signal is a signal that indicates the head of each frame data, and the ESFS signal is a signal that indicates the head of each block data.

Concerning this matter, the CD decoder 8 supplies the CD encoder 15 with a DEFS (Decode EFM Frame Sync) signal which is an EFM frame sync signal and a DSFS (Decode Subcode Frame Sync) signal which is a reference synchronizing signal each obtained by decoding data read from the optical disk 2. For example, the CD decoder 8 detects the frame sync pattern provided for each one frame data and the sub-code sync pattern provided for each one block data by using such a circuit as a pattern coincidence circuit so as to generate the DEFS signal and the DSFS signal, respectively.

In the above-described structure, the optical disk device capable of additional recording (or writing) controls the start position of a recording by demodulating the absolute position (time) information engraved preliminarily in the optical disk 2, comparing the demodulated absolute position information with the aimed position (time) information, and starting a recording predetermined time after the position information coincides with each other. Additionally, in order to synchronize the demodulated absolute position information with the channel clock (data-writing clock) signal that is an original clock of record information, the optical disk device extracts a synchronizing signal from the demodulated information, and then compares the phase of the synchronizing signal with a synchronizing signal generated from the channel clock signal so as to control the revolution of the motor to record at an accurate position.

The above-mentioned absolute position information is preliminarily engraved as a wobble signal in the optical disk 2 as by a wobbling track. Demodulating the ATIP data included in the wobble signal reveals a position on the optical disk 2. The ASYNC signal and the ATIP time information in the ATIP data are extracted by the ATIP decoder 14 that demodulates the ATIP data, and then are supplied to the servo circuit 5 controlling the revolution of the motor and to the CD encoder 15 generating data-writing pulses and controlling the start position of a recording. Then, the CD encoder 15 precisely controls a recording to start at an accurate position.

Immediately before the start of a recording, the servo circuit 5 compares the phase of the ASYNC signal extracted by the ATIP decoder 14 with the phase of the ESFS signal synchronous with the channel clock signal from the CD encoder 15. Further, the servo circuit 5 causes the motor driver 4 to control the revolution of the motor according to the comparison result above. At the start of the recording, the CD encoder 15 compares the ATIP time information on the optical disk 2 with the aimed time information indicating an aimed starting position of the recording so as to detect a coincidence therebetween.

In this course, in order to complement the reliability of the ATIP time information, the CD decoder 8 may supply the CD encoder 15 with Q-channel data of sub-code data (hereinafter referred to as SUBQ data) indicating reproduction time information of data recorded in the optical disk 2, as occasion demands. When the ATIP time information coincides with the aimed time information, the CD encoder 15 starts the recording after a predetermined time, and can have a position on the optical disk 2 precisely correspond to a start timing of the recording.

Figure 3:
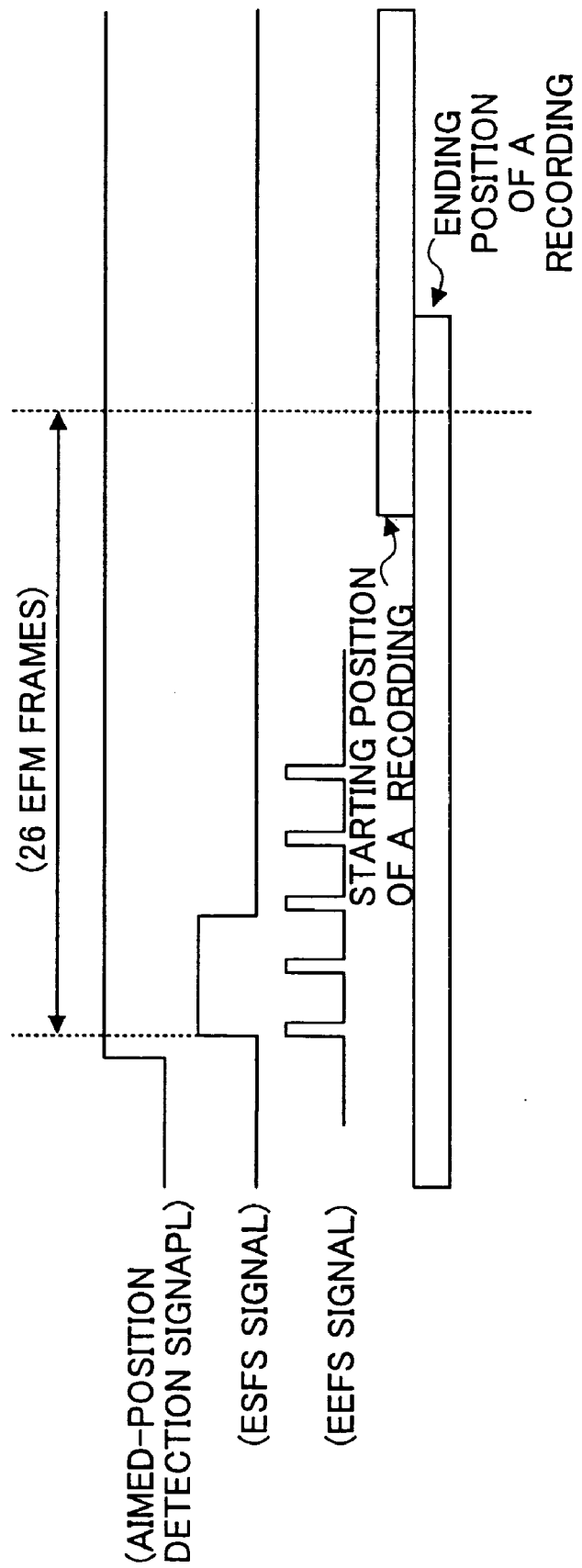
FIG. 3 is an illustration showing a concept of a recording timing control in an additional recording to an optical disk shown in FIG. 1.

Besides, the CD encoder 15 detects the aimed position from the ATIP data supplied from the ATIP decoder 14 or the SUBQ data supplied from the CD decoder 8, and then detects the ESFS signal from the above-detected aimed position, as shown in FIG. 3. Based on the above-detected ESFS signal, the CD encoder 15 detects the starting position of a recording by detecting a number of EFM frames set preliminarily by the system control unit 20 by counting the number of pulses of the EEFS signal, and then starts the recording at the starting position. It is noted that, in FIG. 3, an aimed-position detection signal represents the output signal of the compare unit 49 shown in FIG. 2.

In this course, the ESFS signal and the EEFS signal are generated by counting the channel clock signal generated from the PLL circuit of recording channel bits in the CD encoder 15, and are synchronized with the ATIP data on the optical disk 2 by resetting the counted value by the ASYNC signal before the start of a recording.

Likewise, upon ending a recording, after detecting a preliminarily set number of EFM frames corresponding to the ending position in the last sub-code frame at the ending position of the recording by counting the number of pulses of the EEFS signal, the CD encoder 15 ends the data-recording to the optical disk 2. It is noted that 26 EFM frames indicated in FIG. 3 represent an additional recording position stipulated in the so-called Orange Book setting forth standards regarding additional recording to a CD-R/RW.

Next, a description will be given of the motor revolution control performed by the servo circuit 5 comparing the phase of the ASYNC signal with the phase of the ESFS signal.

Figure 4:
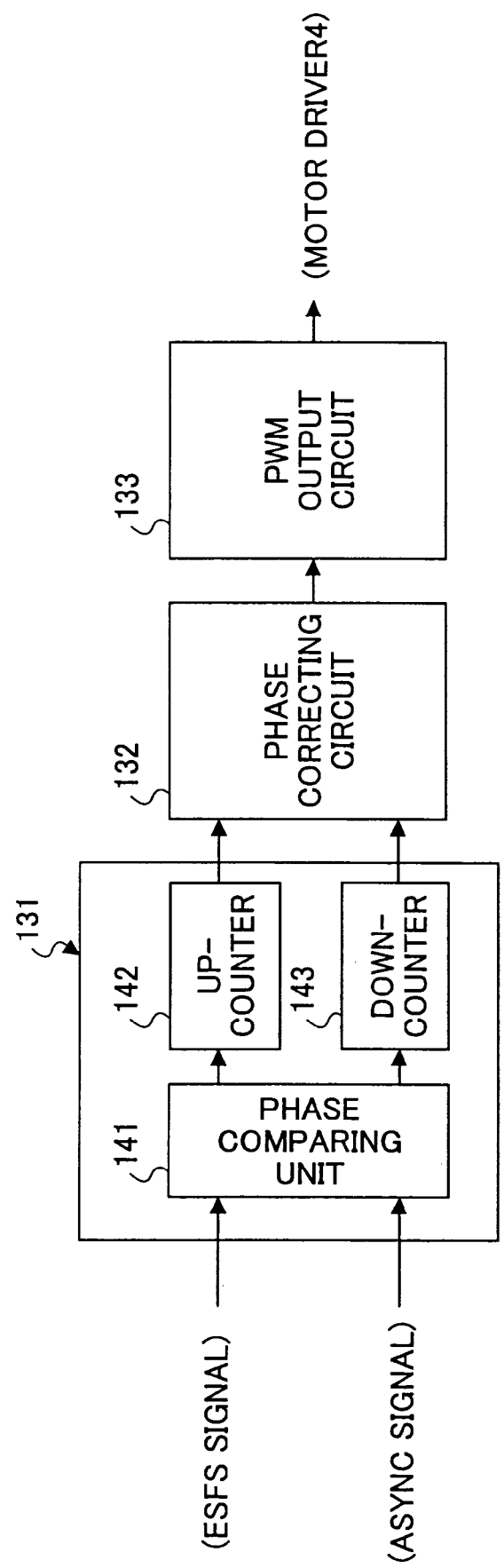
FIG. 4 is a block diagram outlining a part of a structure of a servo circuit shown in FIG. 1.

FIG. 4 is a block diagram outlining a part of a structure of the servo circuit 5, the part performing the motor revolution control by comparing the phase of the ASYNC signal with the phase of the ESFS signal. It is noted that FIG. 4 shows only a part of the servo circuit 5 performing the motor revolution control, since a motor revolution control is normally performed in combination with various controls other than comparing the phase of the ASYNC signal with the phase of the ESFS signal.

In FIG. 4, the servo circuit 5 comprises a phase comparing circuit 131, a phase correcting circuit 132, and a PWM output circuit 133. The phase comparing circuit 131 compares the phase of the ASYNC signal with the phase of the ESFS signal. The phase correcting circuit 132 adjusts a gain that is a response to the motor revolution control regarding the comparison result. The PWM output circuit 133 generates a PWM control signal corresponding to the comparison result given the gain adjustment by the phase correcting circuit 132, and then supplies the PWM control signal to the motor driver 4.

Figure 5:
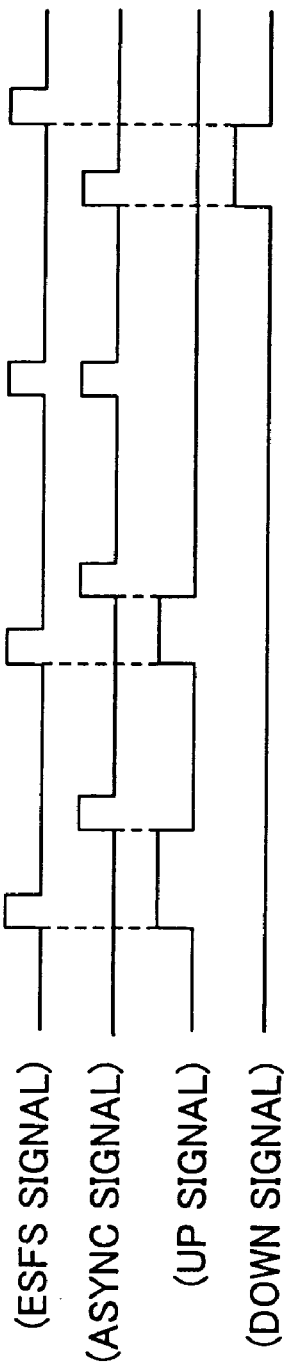
FIG. 5 illustrates waveforms of signals in the servo circuit shown in FIG. 4.

The phase comparing circuit 131 comprises a phase comparing unit 141, an up-counter 142, and a down-counter 143. The phase comparing unit 141 outputs the phase difference between the ASYNC signal and the ESFS signal by generating an UP signal and a DOWN signal as shown in FIG. 5 by using a combination of logic circuits. The up-counter 142 counts the number of high pulses of the UP signal. The down-counter 143 counts the number of high pulses of the DOWN signal. Each of the up-counter 142 and the down-counter 143 operates with the channel clock signal being as a reference clock, and supplies the phase correcting circuit 132 with the counted value thereof as a signal indicating the phase difference between the ASYNC signal and the ESFS signal.

The phase correcting circuit 132 performs a predetermined masking process to each of the counted values supplied from the up-counter 142 and the down-counter 143 so as to supply the PWM output circuit 133 with one particular bit in each of the counted values as a corrected UP signal and a corrected DOWN signal. The bit selection as above performed by the phase correcting circuit 132 can be switched to various types of bit selection according to register settings from the system control unit 20. The PWM output circuit 133 generates the PWM control signal corresponding to the corrected UP signal and the corrected DOWN signal supplied from the phase correcting circuit 132, and then supplies the PWM control signal to the motor driver 4.

Specifically, in the phase correcting circuit 132, selecting the lowest-order bit in each of the counted values supplied from the up-counter 142 and the down-counter 143 results in dividing the phase difference by two with respect to the channel clock signal, and binary signal levels of the corrected UP signal and the corrected DOWN signal switch in a short cycle so that the gain with respect to the motor revolution control becomes high. To the contrary, when selecting a higher-order bit in each of the counted values supplied from the up-counter 142 and the down-counter 143, binary signal levels of the corrected UP signal and the corrected DOWN signal supplied from the phase correcting circuit 132 become constant during a predetermined period, and the corrected UP signal becomes high-level during the predetermined period so that the gain with respect to the motor revolution control becomes low.

The above-described operation can solve the problem that the motor revolution control cannot easily follow a sharp change in revolution in a case where the phase comparison is performed in a cycle of such a low frequency as 75 Hz of the ESFS signal at a normal speed.

It is noted that, in an area of the optical disk 2 having already recorded some data, the above-mentioned wobble signal has a decreased S/N ratio disturbed by the recorded data. Therefore, it becomes difficult to detect the wobble signal stably. This decreases the reliability of the demodulated ATIP data in the area of the optical disk 2 having already recorded some data so as to raise the incidence of erroneous detection of the ASYNC signal.

Accordingly, when the above-mentioned gain in the phase correcting circuit 132 is made too high, the gain, conversely, responds to noises and erroneous detection of the ASYNC signal by the ATIP decoder 14. This causes a problem that the revolution of the spindle motor 3 becomes unstable so that an accurate recording becomes impossible. For this reason, the gain in the phase correcting circuit 132 is so set by the system control unit 20 as not to follow the noises and the erroneous detection of the ASYNC signal by the ATIP decoder 14, normally. Therefore, depending on the change in revolution of the motor, there is a possibility that a displacement occurs between the ATIP time information on the optical disk and a position of recorded data, which cannot be deemed as a precise recording control, in light of an exact additional recording method according to the present invention for accurately performing an additional recording from the ending position of the previous recording.

Thereupon, when performing such an additional recording, the CD encoder 15 uses the DEFS signal obtained from the CD decoder 8 for counting the number of pulses corresponding to a predetermined number of frames so as to control the starting position of a recording, in place of determining the actual starting position of a recording by counting the number of pulses of the EEFS signal as shown in FIG. 3. In other words, the CD encoder 15 uses the DEFS signal obtained by decoding data recorded in the optical disk 2 for counting the number of pulses corresponding to a predetermined number of frames so as to detect the position of the previous recording, in place of counting the EEFS signal generated by counting the channel clock signal to a predetermined number of frames by a frame counter.

Additionally, at the start of recording data to the optical disk 2, the CD encoder 15 again uses the EEFS signal and the ESFS signal synchronous with the cannel clock signal for the timing control of the data-recording to the optical disk. At the end of recording data, the CD encoder 15 ends the data-recording to the optical disk 2 after detecting a preliminarily set number of EFM frames corresponding to the ending position in the last sub-code frame at the ending position of the recording by counting the number of pulses of the EEFS signal, as conventionally.

Besides, before performing an additional recording to the optical disk 2, the CD encoder 15 detects a displacement α between the ATIP time information on the optical disk and a position of recorded data recorded on the optical disk 2 caused by such factors as a change in revolution of the motor. As a method for detecting the displacement α, the CD encoder 15 detects the displacement α by comparing the phase of the DSFS signal obtained from the CD decoder 8 with the phase of the ESFS signal. For example, the EFM output timing control unit 22 of the CD encoder 15 comprises a displacement detecting circuit 51 detecting the displacement α, as shown in FIG. 6.

Figure 6:
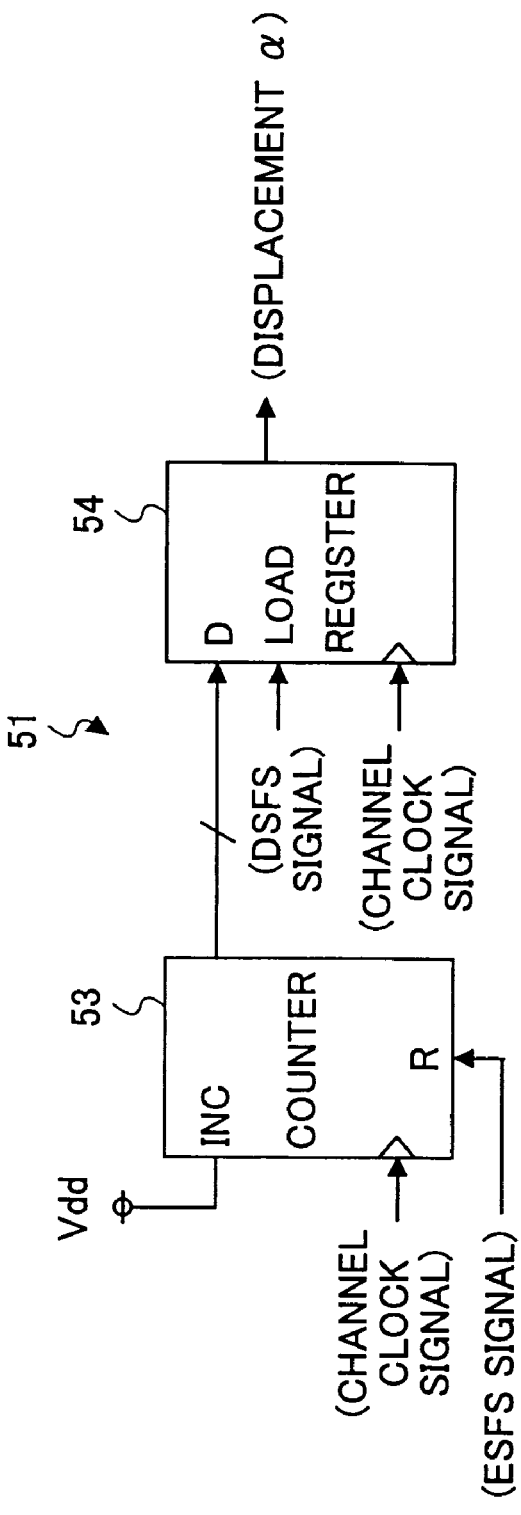
FIG. 6 is a block diagram outlining an example of a structure of a displacement detecting circuit in an EFM output timing control unit shown in FIG. 2.

In FIG. 6, the displacement detecting circuit 51 comprises a counter 53 and a register 54. The counter 53 operates as an up-counter, in which the channel clock is supplied to a clock signal input terminal, the ESFS signal is supplied to a reset signal input terminal R, and an input terminal INC providing settings for a counting operation is connected to a power supply terminal applied with a power source voltage Vdd. The output terminal of the counter 53 is connected to an input terminal D of the register 54. The DSFS signal is supplied from the CD decoder 8 to an input terminal LOAD of the register 54.

The register 54 latches a counted value from the counter 53 when the DSFS signal is high-level. The counted value latched by the register 54 is read out as the displacement α by the system control unit 20. It is further preferable that the displacement detecting circuit 51 has a structure representing the number of EFM frames+the remaining number of channel bits, in which the counter 53 counts to 588 corresponding to one EFM frame so as to generate a carry, and another counter counting the carry is further provided, because a circuit scale can be made small.

Figure 7:
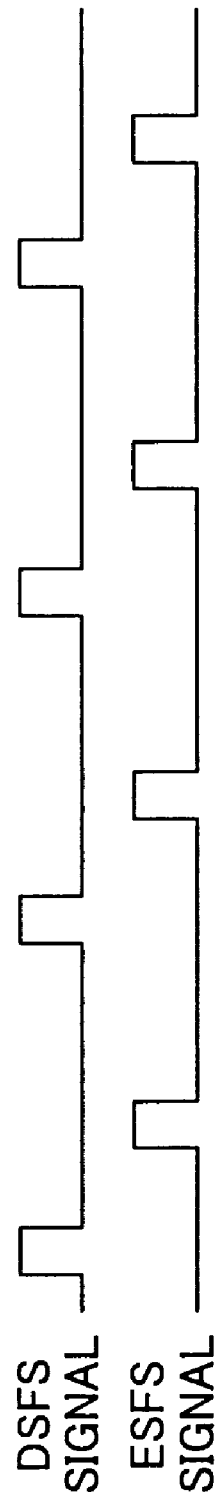
FIG. 7 illustrates a phase relationship between a DSFS signal and an ESFS signal in a normal condition.

In the above-mentioned structure, in the additional recording control, the absolute position information on the optical disk 2 and the recording timing based on the channel clock are synchronized with each other by the motor revolution control by the servo circuit 5. In this case, if the absolute position information on the optical disk 2 and a position information already recorded on the optical disk 2 coincide completely with each other, the DSFS signal and the ESFS signal have a phase relationship as shown in FIG. 7. Accordingly, the counted value latched by the register 54 representing the displacement α indicates a theoretical, constant offset value. The offset value is a total of a circuit-intrinsic delay amount required for decoding in the ATIP decoder 14, a circuit-intrinsic delay amount required for decoding recorded data by the CD decoder 8, and a circuit-intrinsic delay amount before comparing the DSFS signal and the ESFS signal in the CD decoder 8.

Figure 8:
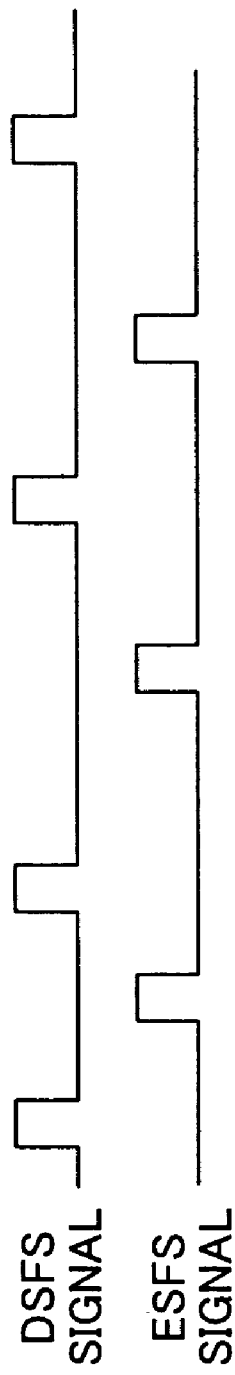
FIG. 8 illustrates a phase relationship between the DSFS signal and the ESFS signal when the phases of the DSFS signal and the ESFS signal are displaced from each other.

On the other hand, if the absolute position information on the optical disk 2 and a position information already recorded on the optical disk 2 do not coincide completely with each other, the DSFS signal and the ESFS signal have a phase relationship shown in FIG. 8 as an example. Accordingly, the counted value latched by the register 54 representing the displacement a indicates a value other than the above-mentioned offset value. According to the counted value of immediately before the start of a recording, the displacement α of the position information recorded on the optical disk 2 from the absolute position information on the optical disk 2 can be detected.

Accordingly, immediately before the start of a recording in an additional recording operation, the system control unit 20 reads out the counted value from the register 54 so as to detect the displacement α. Then, when the displacement α surpasses a predetermined threshold value A, the system control unit 20 switches the gain in the phase correcting circuit 132 in the servo circuit 5. For example, when the displacement α surpasses a predetermined threshold value THa, the system control unit 20 causes the servo circuit 5 to perform the motor revolution control by making the gain in the phase correcting circuit 132 higher than normal from immediately before the start of the recording.

Figure 9:
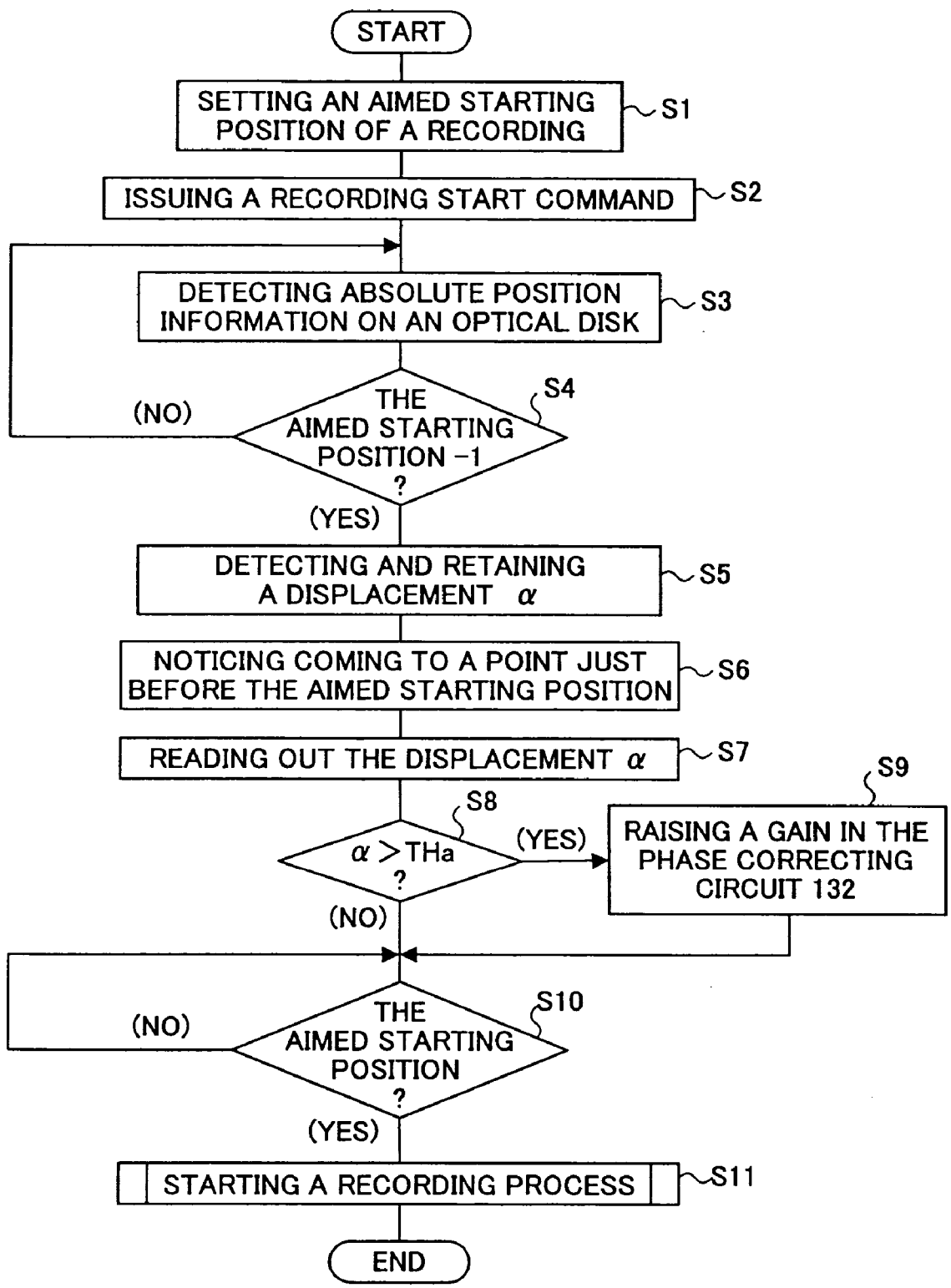
FIG. 9 is a flowchart showing an example of an operation of the additional recording to the optical disk in the optical disk device shown in FIG. 1.

FIG. 9 is a flowchart showing an example of the additional recording to the optical disk 2. A further description will be given, with reference to FIG. 9, of an operation of the additional recording to the optical disk 2, especially of a procedure of operations of the servo circuit 5, the CD encoder 15 and the system control unit 20.

In FIG. 9, first, the system control unit 20 sets time information indicating an aimed starting position of a recording in the aimed time information register 48 in the CD encoder 15 (step S1). Then, the system control unit 20 issues a data-recording start command to the CD encoder 15 (step S2).

The time information judging unit 23 detects absolute position information on the optical disk 2 from ATIP data or sub-code data (step S3). The EFM output timing control unit 22 detects block data just before the aimed starting position according to a comparison result in the compare unit 49 (step S4). When the EFM output timing control unit 22 does not detect the preceding block data (NO), the procedure returns to the step S3. On the other hand, when the EFM output timing control unit 22 does detect the preceding block data in the step S4 (YES), the EFM output timing control unit 22 detects the displacement $\alpha$ by comparing the phase of the DSFS signal obtained from the CD decoder 8 with the phase of the ESFS signal generated therein, and then retains the displacement $\alpha$ in the register 54 (step S5).

Subsequently, when coming to a point a predetermined value from the aimed starting position based on the comparison result in the compare unit 49, the EFM output timing control unit 22 notifies the system control unit 20 of coming to the above-mentioned point (step S6). Then, the system control unit 20 reads out the displacement $\alpha$ retained in the register 54 of the EFM output timing control unit 22 (step S7).

The system control unit 20 judges whether or not the displacement $\alpha$ surpasses the predetermined threshold value THa (step S8). When the displacement $\alpha$ surpasses the predetermined threshold value THa (YES), the system control unit 20 performs a setting to the phase correcting circuit 132 of the servo circuit 5 so as to raise a gain therein. For example, the system control unit 20 performs a setting so that the gain becomes the highest value when a plurality of values are prepared for the gain (step S9).

Thereafter, the EFM output timing control unit 22 judges whether or not the comparison result in the compare unit 49 indicates the aimed starting position of the recording (step S10). When the EFM output timing control unit 22 detects the aimed starting position of the recording (YES), the EFM output timing control unit 22 performs a recording process to the optical disk 2 (step S11), and the procedure in this flowchart ends. On the other hand, when the EFM output timing control unit 22 does not detect the aimed starting position of the recording in the step S10 (NO), the EFM output timing control unit 22 performs judging whether or not the comparison result indicates the aimed starting position of the recording until the EFM output timing control unit 22 detects the aimed starting position of the recording. Besides, in the step S8, when the displacement $\alpha$ does not surpass the predetermined threshold value THa (NO), the procedure in this flowchart ends after performing the step S10 and the step S11.

Although, in the above description, the system control unit 20 judges whether or not the displacement $\alpha$ surpasses the threshold value THa, the EFM output timing control unit 22 may perform this judgment in place of the system control unit 20 so as to reduce the burden of the system control unit 20. In this arrangement, the EFM output timing control unit 22 may further comprise a threshold-value setting register (not shown in the figure) having the threshold value THa set preliminarily from the system control unit 20 prior to the recording start control.

The EFM output timing control unit 22 compares the displacement $\alpha$ retained in the register 54 with the threshold value THa set in the above-mentioned threshold-value setting register. Then, when the displacement $\alpha$ surpasses the threshold value THa, the EFM output timing control unit 22 notifies the system control unit 20 by supplying such a signal as an interrupt signal. Upon receiving the interrupt signal, the system control unit 20 performs the setting to the phase correcting circuit 132 of the servo circuit 5 so as to raise the gain therein.

Figure 10:
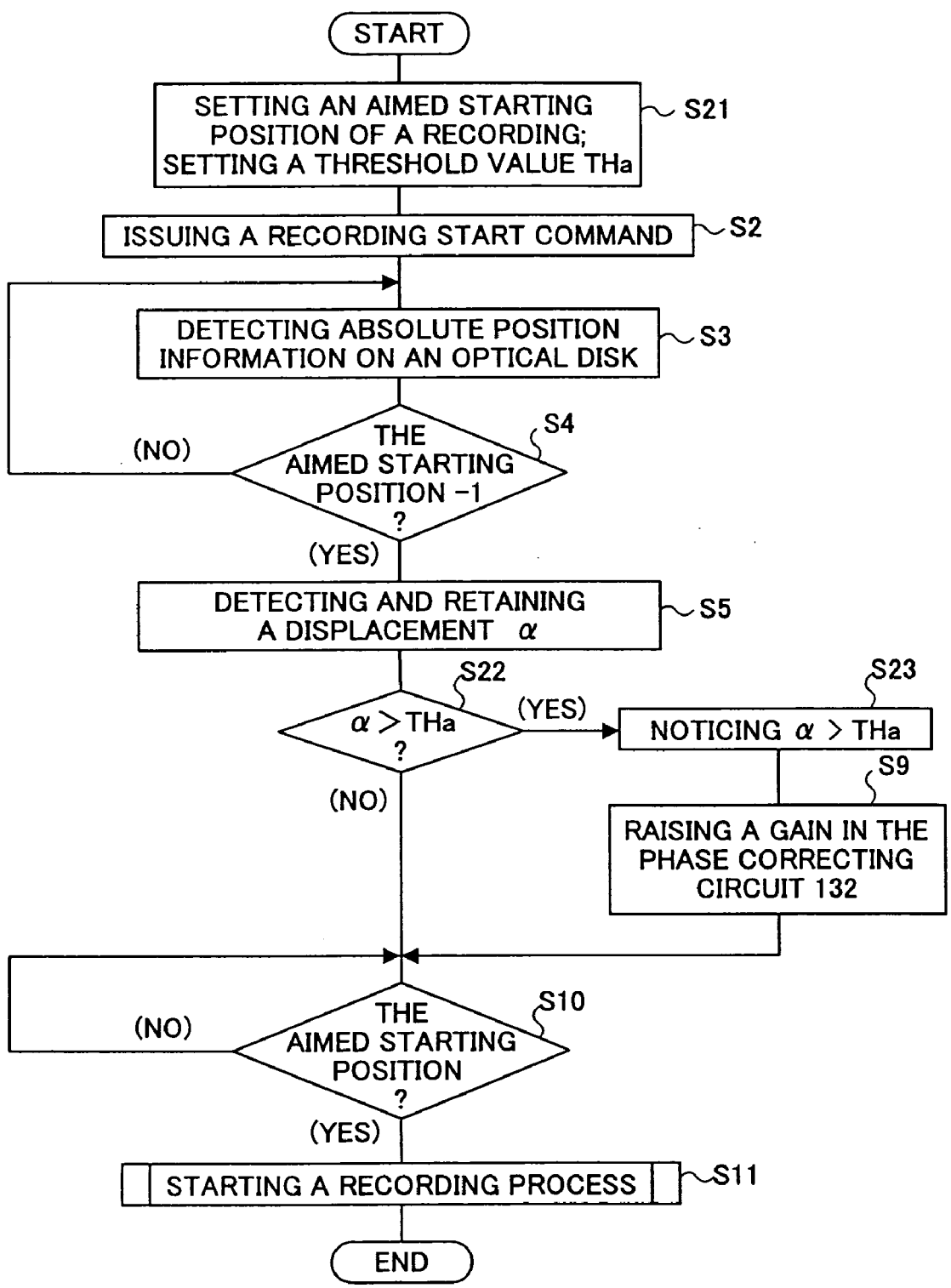
FIG. 10 is a flowchart showing another example of the operation of the additional recording to the optical disk in the optical disk device shown in FIG. 1.

FIG. 10 is a flowchart showing an example of the operation of the additional recording to the optical disk 2 with the above-mentioned arrangement. Steps in FIG. 10 that are identical or equivalent to the steps shown in FIG. 9 are referenced by the same reference marks, and will not be described in this description.

In FIG. 10, first, the system control unit 20 sets time information indicating an aimed starting position of a recording in the aimed time information register 48 in the CD encoder 15, and sets the threshold value THa in the above-mentioned threshold-value setting register in the EFM output timing control unit 22 (step S21).

Then, after the step S2 to the step S5 shown in FIG. 9 are performed, the EFM output timing control unit 22 judges whether or not the displacement $\alpha$ surpasses the predetermined threshold value THa (step S22). When the displacement $\alpha$ does not surpass the predetermined threshold value THa (NO), the procedure in this flowchart ends after performing the step S10 and the step S11 shown in FIG. 9. On the other hand, when the displacement $\alpha$ surpasses the predetermined threshold value THa in the step S22 (YES), the EFM output timing control unit 22 notifies the system control unit 20 that the displacement $\alpha$ surpasses the predetermined threshold value THa (step S23). Then, after performing the step S9 to the step S11 shown in FIG. 9, the procedure in this flowchart ends.

As described above, the optical disk device according to the first embodiment of the present invention detects the displacement $\alpha$ as of immediately before the start of a recording by comparing the phase of the DSFS signal obtained in the CD decoder 8 by reproducing information recorded in the optical disk 2 with the phase of the ESFS signal generated from the channel clock signal forming data-writing reference clocks in the EFM output timing control unit 22 of the CD encoder 15 so that the system control unit 20 switches the gain in the phase correcting circuit 132 of the servo circuit 5 according to the displacement $\alpha$. Accordingly, when information is recorded at a position displaced from the absolute position on the optical disk 2, the displacement can be immediately corrected in the next recording so as to prevent the accumulation of the displacement $\alpha$ beforehand, realizing an efficient and accurate recording control.

Embodiment 2

In the above-described first embodiment, the gain in the phase correcting circuit 132 is switched according to whether or not the displacement $\alpha$ surpasses the threshold value THa. However, the gain in the phase correcting circuit 132 may be switched according to whether or not the displacement $\alpha$ surpasses a displacement detected last time. A second embodiment of the present embodiment achieves this arrangement.

Based on the optical disk device 1 according to the above-described first embodiment, an optical disk device 1$a$ according to the present second embodiment further comprises a history-information register (not shown in the figure) in the EFM output timing control unit 22 of the CD encoder 15, the history-information register retaining history information of the displacement $\alpha$, for example, the displacement $\alpha$ detected last time. Accordingly, in the optical disk device 1*a*, the EFM output timing control unit 22 is an EFM output timing control unit 22*a*, and the CD encoder 15 is a CD encoder 15*a*.

Except the above-mentioned points, the optical disk device 1*a* is identical to the optical disk device 1 according to the foregoing first embodiment. Therefore, A block diagram illustrating a structure of the optical disk device 1*a*, a block diagram illustrating a structure of the CD encoder 15*a*, a block diagram showing the servo circuit 5, and a block diagram showing the displacement detecting circuit 51 are omitted. Hereinbelow, a description will be given, with reference to the figures referenced in describing the first embodiment, of points different from the first embodiment, by substituting the optical disk device 1*a*, the CD encoder 15*a*, and the EFM output timing control unit 22*a*.

The EFM output timing control unit 22*a* causes the register 54 to retain the displacement α detected in the displacement detecting circuit 51, and causes the above-mentioned history-information register to retain the last displacement α retained in the register 54. Further, the EFM output timing control unit 22*a* compares the present displacement $\alpha_n$ (n is a natural number: n>0) retained in the register 54 with the last displacement $\alpha_{n-1}$ retained in the history-information register. When the present displacement $\alpha_n$ surpasses the last displacement $\alpha_{n-1}$ the EFM output timing control unit 22*a* performs a setting to the phase correcting circuit 132 of the servo circuit 5 so as to raise the gain therein. For example, the EFM output timing control unit 22*a* performs a setting so that the gain becomes the highest value when a plurality of values are prepared for the gain.

Figure 11:
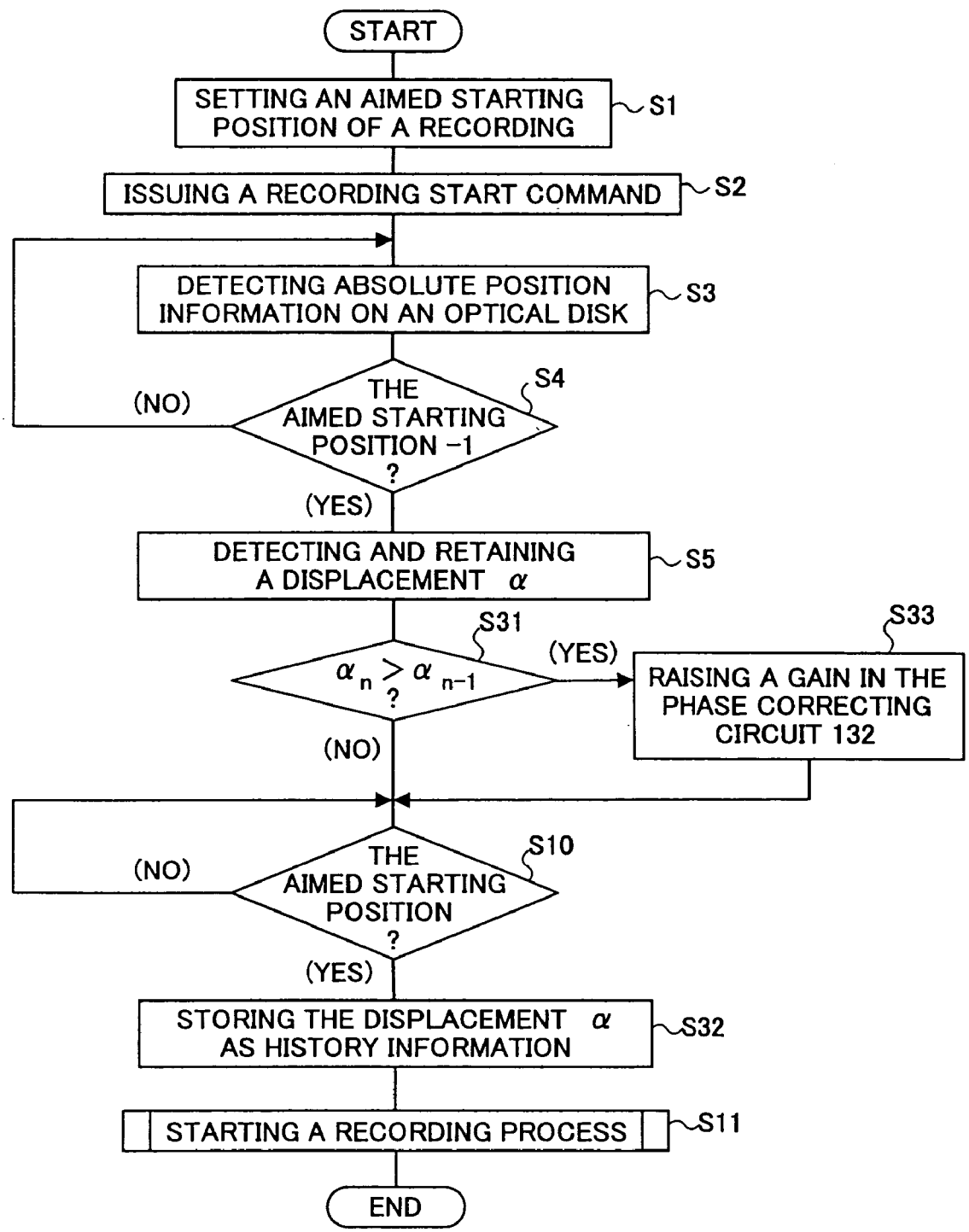
FIG. 11 is a flowchart showing an example of an additional recording operation in an optical disk device according to a second embodiment of the present invention.

FIG. 11 is a flowchart showing an example of an additional recording to the optical disk 2 in the optical disk device 1*a*. Here, a further description will be given, with reference to FIG. 11, of an operation of the additional recording to the optical disk 2, especially of a procedure (a flow) of operations of the servo circuit 5, the CD encoder 15*a* and the system control unit 20. It is noted that, although the following description according to the present second embodiment is based on the procedure shown in FIG. 9, the second embodiment is also applicable to the procedure shown in FIG. 10 in a similar manner; thus the description associated with FIG. 10 will be omitted. Additionally, steps in FIG. 11 that are identical or equivalent to the steps shown in FIG. 9 are referenced by the same reference marks, and will not be described in this description.

In FIG. 11, first, the step S1 to the step S5 shown in FIG. 9 are performed. Thereafter, the EFM output timing control unit 22*a* judges whether or not the present displacement $\alpha_n$ retained in the register 54 surpasses the last displacement $\alpha_{n-1}$ stored in the history-information register (step S31). When the present displacement $\alpha_n$ does not surpass the last displacement $\alpha_{n-1}$ (NO), the step S10 shown in FIG. 9 is performed. Subsequently, the EFM output timing control unit 22*a* stores the present displacement $\alpha_n$ in the history-information register as the last displacement $\alpha_{n-1}$ (step S32). Thereafter, the procedure in this flowchart ends after performing the step S11 shown in FIG. 9.

On the other hand, when the present displacement $\alpha_n$ surpasses the last displacement $\alpha_{n-1}$, in the step S31 (YES), the EFM output timing control unit 22*a* performs a setting to the phase correcting circuit 132 of the servo circuit 5 so as to raise the gain therein. For example, the EFM output timing control unit 22*a* performs a setting so that the gain becomes the highest value when a plurality of values are prepared for the gain (step S33). Subsequently, after performing the step S10 shown in FIG. 9, the step S32, and the step S11 shown in FIG. 9, the procedure in this flowchart ends.

As described above, in the optical disk device according to the present second embodiment, the CD encoder 15*a* (comprising the EFM output timing control unit 22*a*), not the system control unit 20, switches the gain in the phase correcting circuit 132 according to whether or not the displacement $\alpha_n$ surpasses the last displacement $\alpha_{n-1}$. Accordingly, the second embodiment not only provides the same effects as the foregoing first embodiment, but also can detect the accumulation of relative displacement from the last recording control, realizing an efficient, accurate and optimal recording control that can immediately correct the displacement from the absolute position on the optical disk.

Embodiment 3

The gain once switched may be switched back to the previous gain after a predetermined period has elapsed. A third embodiment of the present embodiment achieves this arrangement.

Based on the optical disk device 1 according to the above-described first embodiment, an optical disk device 1*b* according to the present third embodiment further comprises a present-position information register (not shown in the figure) in the EFM output timing control unit 22 of the CD encoder 15. In this structure, present-position information is supplied from the data correction unit 47 via the compare unit 49 to the EFM output timing control unit 22, and is stored in the above-mentioned present-position information register. The EFM output timing control unit 22 supplies the system control unit 20 with a predetermined interrupt signal corresponding to the pulse of the ESFS signal. Accordingly, in the optical disk device 1*b*, the EFM output timing control unit 22 is an EFM output timing control unit 22*b*, and the CD encoder 15 is a CD encoder 15*b*.

Except the above-mentioned points, the optical disk device 1*b* is identical to the optical disk device 1 according to the foregoing first embodiment. Therefore, A block diagram illustrating a structure of the optical disk device 1*b*, a block diagram illustrating a structure of the CD encoder 15*b*, a block diagram showing the servo circuit 5, and a block diagram showing the displacement detecting circuit 51 are omitted. Hereinbelow, a description will be given, with reference to the figures referenced in describing the first embodiment, of points different from the first embodiment, by substituting the optical disk device 1*b*, the CD encoder 15*b*, and the EFM output timing control unit 22*b*.

The EFM output timing control unit 22*b* is supplied with present-position information from the data correction unit 47 via the compare unit 49, and stores the present-position information in the above-mentioned present-position information register. The EFM output timing control unit 22*b* also supplies the system control unit 20 with a predetermined interrupt signal corresponding to the pulse of the ESFS signal. Based on the interrupt signal supplied from the EFM output timing control unit 22*b*, the system control unit 20 reads out the present-position information stored in the above-mentioned present-position information register regularly, for example, for each sector. Further, when the system control unit 20 has performed a setting to the phase correcting circuit 132 of the servo circuit 5 so as to raise the gain therein, the system control unit 20 performs a setting to the phase correcting circuit 132 so as to decrease the gain back to the normal value after a predetermined period has elapsed, for example after several tens of sectors.

Figure 12:
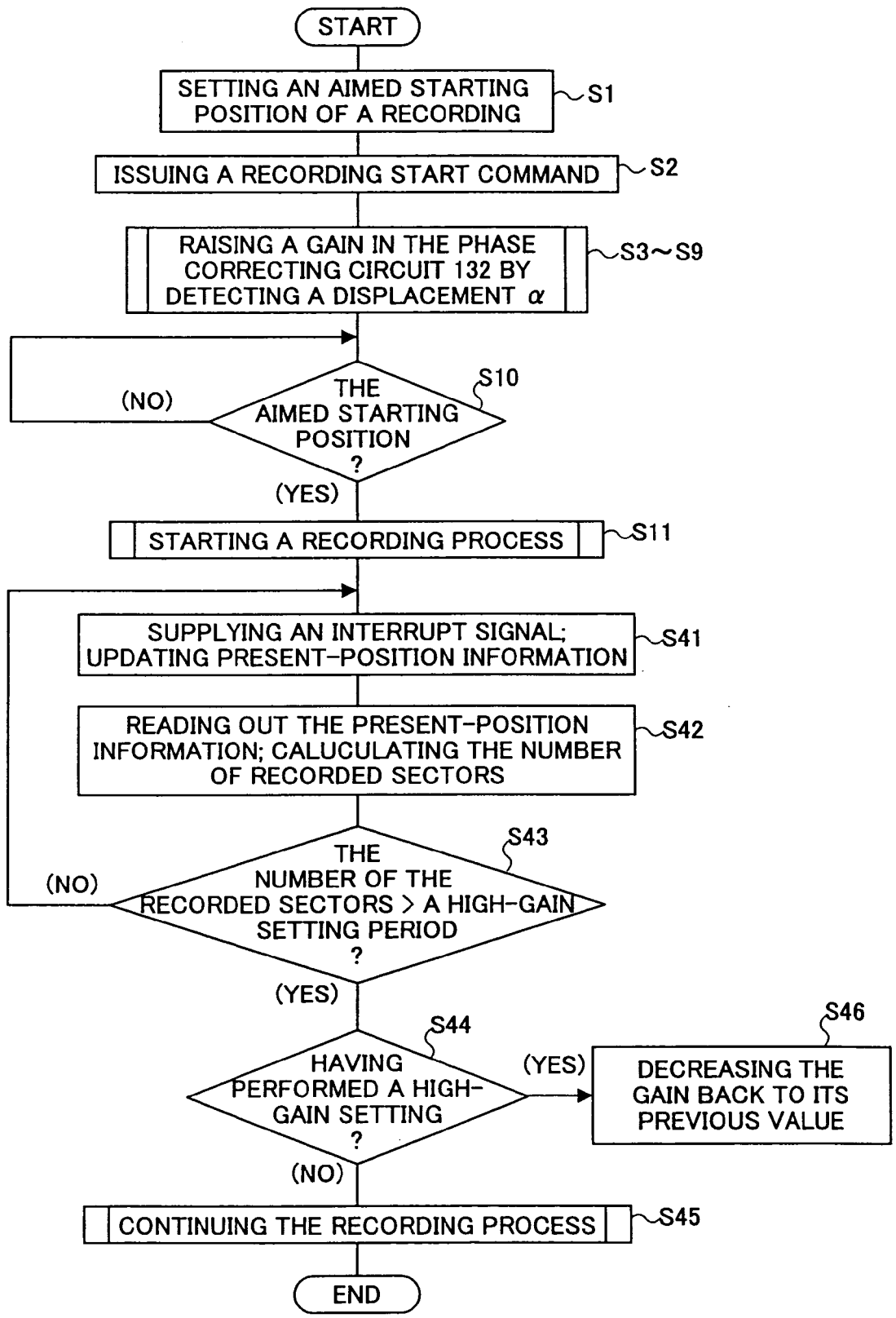
FIG. 12 is a flowchart showing an example of an additional recording operation in an optical disk device according to a third embodiment of the present invention.

FIG. 12 is a flowchart showing an example of an additional recording to the optical disk 2 in the optical disk device 1b. Here, a further description will be given, with reference to FIG. 12, of an operation of the additional recording to the optical disk 2, especially of a procedure (a flow) of operations of the servo circuit 5, the CD encoder 15b and the system control unit 20. It is noted that, although the following description according to the present third embodiment is based on the procedure shown in FIG. 9 of the first embodiment, the third embodiment is also applicable to the procedure shown in FIG. 10 of the first embodiment and to the procedure of the second embodiment in similar manners; thus the descriptions associated therewith will be omitted. Additionally, steps in FIG. 12 that are identical or equivalent to the steps shown in FIG. 9 are referenced by the same reference marks, and will not be described in this description.

In FIG. 12, first, the step S1 to the step S11 shown in FIG. 9 are performed. Thereafter, the EFM output timing control unit 22b generates a predetermined interrupt signal corresponding to the pulse of the ESFS signal, and supplies the interrupt signal to the system control unit 20. Also, the EFM output timing control unit 22b is supplied with present-position information from the data correction unit 47 via the compare unit 49, and updates and stores the present-position information in the above-mentioned present-position information register (step S41). Next, the system control unit 20 reads out the present-position information stored in the above-mentioned present-position information register so as to calculate the number of sectors of data recorded on the optical disk 2 (step S42).

The system control unit 20 judges whether or not the calculated number of the recorded sectors surpasses a predetermined high-gain setting period (step S43). When the calculated number of the recorded sectors does not surpass the predetermined high-gain setting period (NO), the procedure returns to the step S41. On the other hand, when the calculated number of the recorded sectors surpasses the predetermined high-gain setting period in the step S43 (YES), the system control unit 20 judges whether or not the system control unit 20 has performed a setting (a high-gain setting) to the phase correcting circuit 132 of the servo circuit 5 so as to raise the gain therein (step S44). When the system control unit 20 has not performed the setting (NO), the CD encoder 15b continues the recording process to the optical disk 2 (step S45), and thereafter the procedure in this flowchart ends. On the other hand, when the system control unit 20 is judged to have performed the setting in the step S44 (YES), the system control unit 20 performs a setting to the phase correcting circuit 132 so as to decrease the gain back to the previous value thereof (step S46), and thereafter the procedure in this flowchart ends.

Although, in the above description, the system control unit 20 judges whether or not the calculated number of the recorded sectors surpasses the predetermined high-gain setting period, the EFM output timing control unit 22b may perform this judgment in place of the system control unit 20 so as to reduce the burden of the system control unit 20. In this arrangement, the EFM output timing control unit 22b may further comprise a high-gain period setting register (not shown in the figure) having the high-gain setting period set preliminarily from the system control unit 20.

The system control unit 20 preliminarily sets a predetermined number of sectors as the high-gain setting period in the above-mentioned high-gain period setting register, prior to the start of recording data to the optical disk 2. The EFM output timing control unit 22b further comprises a recorded-sector counter (not shown in the figure) counting to the predetermined number of the sectors from the start of recording data to the optical disk 2, and counts the number of recorded sectors by counting up the number in the above-mentioned recorded-sector counter for each pulse of the ESFS signal. Upon finishing the count-up to the predetermined number of the sectors set in the above-mentioned high-gain period setting register, the EFM output timing control unit 22b causes the phase correcting circuit 132 of the servo circuit 5 to decrease the gain back to the previous value thereof.

Figure 13:
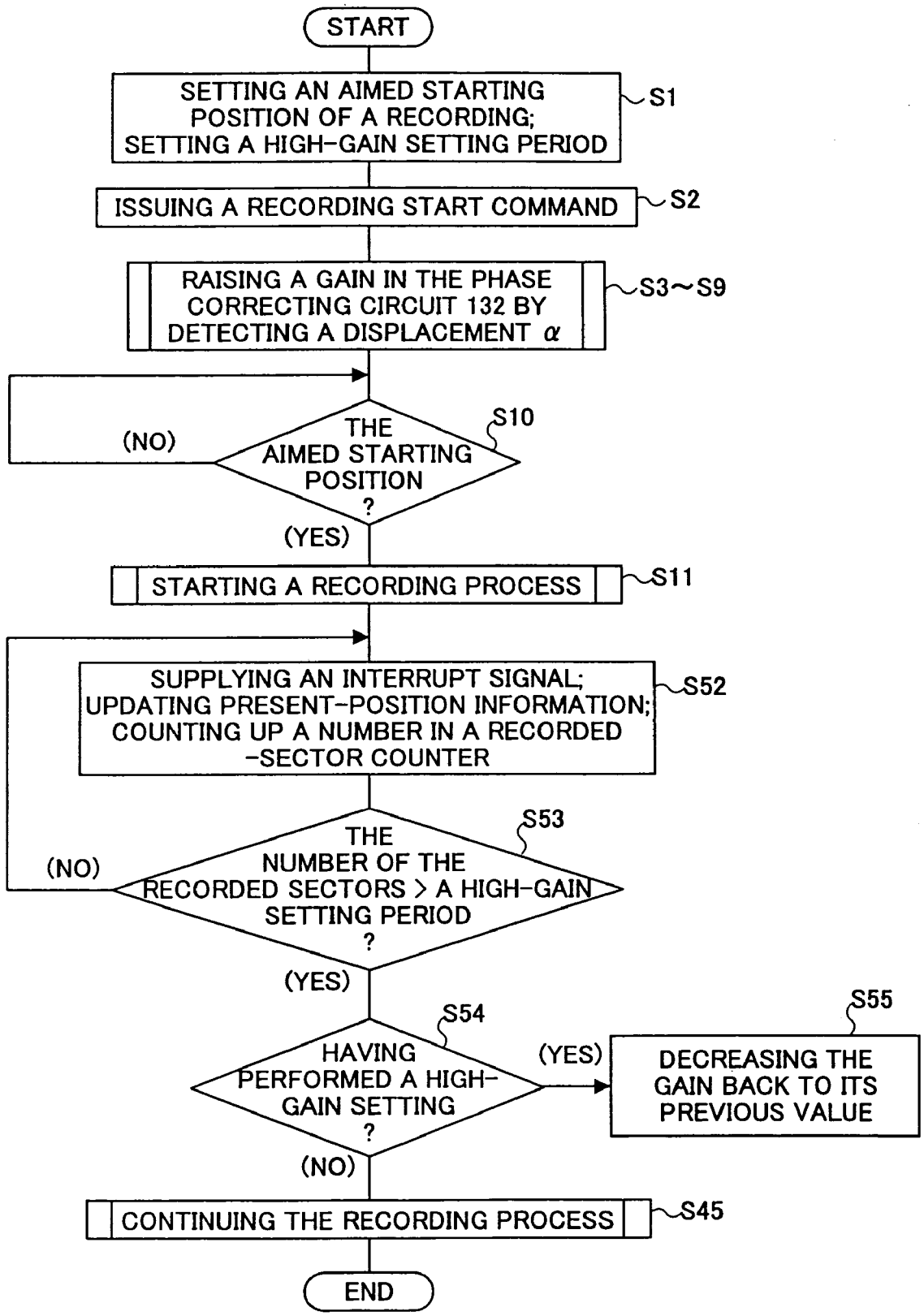
FIG. 13 is a flowchart showing another example of an additional recording operation in the optical disk device according to the third embodiment of the present invention.

FIG. 13 is a flowchart showing an example of an additional recording to the optical disk 2 in the optical disk device 1b with the above-mentioned arrangement. Steps in FIG. 13 that are identical or equivalent to the steps shown in FIG. 12 are referenced by the same reference marks, and will not be described in the following description.

In FIG. 13, first, the system control unit 20 sets time information indicating an aimed starting position of a recording in the aimed time information register 48 in the CD encoder 15b, and sets the high-gain setting period in the above-mentioned high-gain period setting register of the EFM output timing control unit 22b (step S51).

Next, the step S2 to the step S11 shown in FIG. 9 are performed. Thereafter, the EFM output timing control unit 22b generates the predetermined interrupt signal corresponding to the pulse of the ESFS signal, and supplies the interrupt signal to the system control unit 20. Also, the EFM output timing control unit 22b is supplied with present-position information from the data correction unit 47 via the compare unit 49, and updates and stores the present-position information in the above-mentioned present-position information register. Further, the EFM output timing control unit 22b counts the number of recorded sectors by counting up the number in the above-mentioned recorded-sector counter for each pulse of the ESFS signal (step S52).

Then, the EFM output timing control unit 22b judges whether or not the number of the recorded sectors counted in the above-mentioned recorded-sector counter surpasses the number of sectors indicating the high-gain setting period set in the above-mentioned high-gain period setting register (step S53). When the number of the recorded sectors does not surpass the predetermined high-gain setting period (NO), the procedure returns to the step S52. On the other hand, when the number of the recorded sectors surpasses the high-gain setting period in the step S53 (YES), the EFM output timing control unit 22b notifies the system control unit 20 that the number of the recorded sectors surpasses the high-gain setting period, and accordingly, the system control unit 20 judges whether or not the system control unit 20 has performed a setting to the phase correcting circuit 132 of the servo circuit 5 so as to raise the gain therein (step S54).

When the system control unit 20 is judged to have not performed the setting in the step S54 (NO), the step S45 shown in FIG. 12 is performed, and thereafter the procedure in this flowchart ends. On the other hand, when the system control unit 20 is judged to have performed the setting in the step S54 (YES), the system control unit 20 notifies the EFM output timing control unit 22b that the system control unit 20 has performed the above-mentioned setting, and accordingly, the EFM output timing control unit 22b performs a setting to the phase correcting circuit 132 so as to decrease the gain back to the previous value thereof (step S55), and thereafter the procedure in this flowchart ends.

As described above, in the optical disk device according to the present third embodiment, after a predetermined period has elapsed since the start of recording data to the optical disk 2, for example after a predetermined number of sectors have been recorded since the start of recording data, and when a setting has been performed to the phase correcting circuit 132 of the servo circuit 5 so as to raise the gain therein, the gain is decreased back to the previous value thereof. Accordingly, the third embodiment not only provides the same effects as the foregoing first embodiment, but also can increase the gain in the servo circuit only when necessary so as to limit the period during which the gain is increased. This can reduce the side effect caused by increasing the gain in the servo circuit, such as following noises and erroneous detection of the ASYNC signal resulting in an unstable motor revolution control; thus, a stable and optimal recording control can be realized.

Embodiment 4

In the above-described first to third embodiments, when the displacement α surpasses a predetermined value, the gain in the phase correcting circuit 132 of the servo circuit 5 is raised, and a data-recording is performed to the optical disk 2. However, when the displacement α surpasses the predetermined value, the speed of a data-recording to the optical disk 2 may be decreased, and thereafter, the displacement α may be re-detected. A fourth embodiment of the present embodiment achieves this arrangement.

Based on the optical disk device 1 according to the above-described first embodiment, an optical disk device 1c according to the present fourth embodiment is so arranged that, when the displacement α surpasses the predetermined threshold value THa, the system control unit 20 causes the servo circuit 5 and the EFM output timing control unit 22 of the CD encoder 15 to decrease the speed of recording data to the optical disk 2 so as to re-detect the displacement α. As a specific method for decreasing the speed of recording data, the system control unit 20 causes the clock signal generating unit 21 of the CD encoder 15 to decrease the frequency of the channel clock signal generated therein, and causes the servo circuit 5 to decrease the revolution speed of the spindle motor 3.

Accordingly, the optical disk device 1c comprises a system control unit 20c in place of the system control unit 20, a clock signal generating unit 21c in place of the clock signal generating unit 21, and accordingly a CD encoder 15c instead of the CD encoder 15.

Except the above-mentioned points, the optical disk device 1c is identical to the optical disk device 1 according to the foregoing first embodiment. Therefore, A block diagram illustrating a structure of the optical disk device 1c, a block diagram showing a part of the servo circuit 5, and a block diagram showing the displacement detecting circuit 51 are omitted. Hereinbelow, a description will be given, with reference to the figures referenced in describing the first embodiment, of points different from the first embodiment, by substituting the optical disk device 1c, the CD encoder 15c, the system control unit 20c, and the clock signal generating unit 21c.

Figure 14:
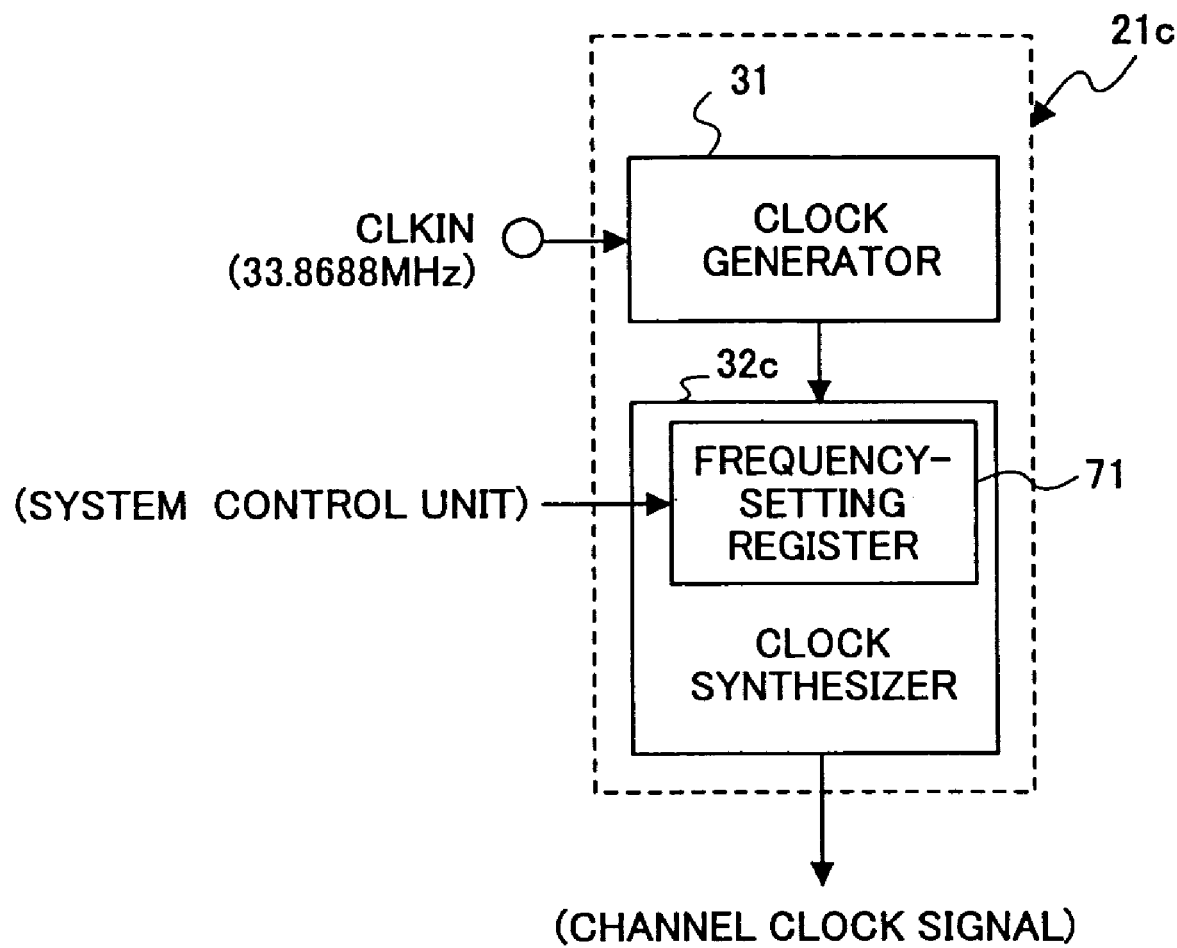
FIG. 14 is a block diagram outlining an example of a structure of a clock signal generating unit in an optical disk device according to a fourth embodiment of the present invention.

FIG. 14 is a block diagram outlining a structure of the clock signal generating unit 21c. It is noted that elements of the CD encoder 15c other than in the clock signal generating unit 21c are identical or equivalent to the elements of the CD encoder 15 shown in FIG. 2, and thus will not be shown in FIG. 14. Additionally, elements shown in FIG. 14 that are identical or equivalent to the elements shown in FIG. 2 are referenced by the same reference marks, and will not be described in the following description. With reference to FIG. 14, only points different from the clock signal generating unit 21 shown in FIG. 2 will be described.

Different from the clock signal generating unit 21 shown in FIG. 2, the clock signal generating unit 21c shown in FIG. 14 further comprises a frequency-setting register 71 in the clock synthesizer 32 so as to set the frequency of the channel clock signal generated therein, in which the clock synthesizer 32 generates and outputs a channel clock signal having the frequency set in the frequency-setting register 71. Accordingly, the clock synthesizer 32 in FIG. 2 is depicted as a clock synthesizer 32c in FIG. 14. The system control unit 20c sets the frequency in the frequency-setting register 71. The clock synthesizer 32 generates a channel clock signal having the frequency set in the frequency-setting register 71, and then supplies the channel clock signal to each of the elements of the CD encoder 15c, such as the EFM output timing control unit 22.

The EFM output timing control unit 22 compares the displacement α retained in the register 54 with the threshold value THa set in the above-mentioned threshold-value setting register. When the displacement α surpasses the threshold value THa, the EFM output timing control unit 22 notifies the system control unit 20c by supplying such a signal as an interrupt signal. Upon receiving the interrupt signal, the system control unit 20c decreases the frequency set in the frequency-setting register 71 so as decrease the frequency of the channel clock signal supplied from the clock synthesizer 32c. At the same time, the system control unit 20c orders the servo circuit 5 to decrease the revolution speed of the spindle motor 3.

After decreasing the speed of recording data to the optical disk 2 in the above-mentioned manner, the system control unit 20c performs the series of the recording control again so as to start recording data from the aimed starting position of recording the data on the optical disk 2.

Figure 15:
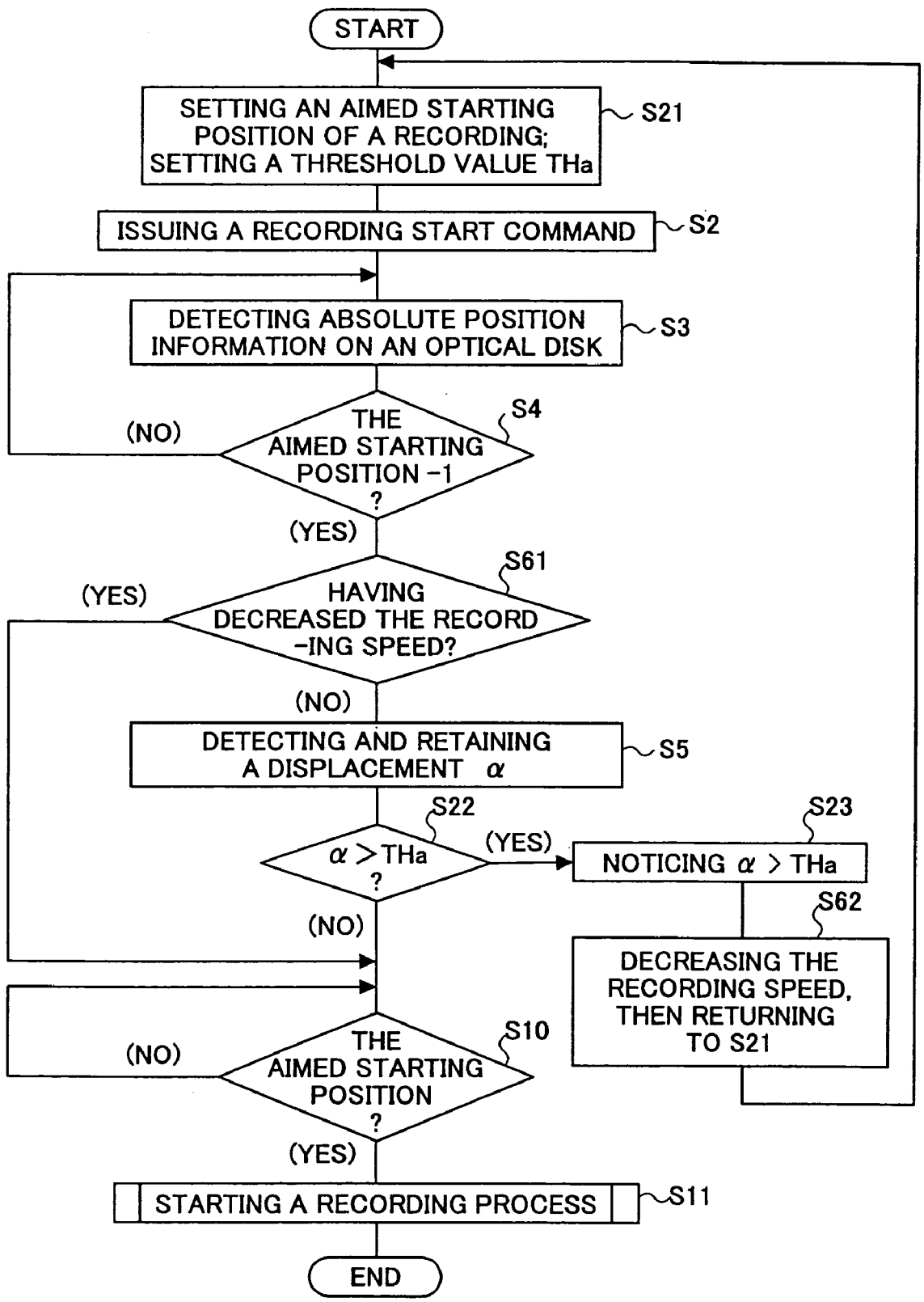
FIG. 15 is a flowchart showing an example of an additional recording operation in the optical disk device according to the fourth embodiment of the present invention.

FIG. 15 is a flowchart showing an example of an additional recording to the optical disk 2 in the optical disk device 1c. Here, a further description will be given, with reference to FIG. 15, of an operation of the additional recording to the optical disk 2, especially of a procedure (a flow) of operations of the servo circuit 5, the CD encoder 15c and the system control unit 20c. It is noted that, although the following description according to the present fourth embodiment is based on the procedure shown in FIG. 10 of the foregoing first embodiment, the fourth embodiment is also applicable to the procedure shown in FIG. 9 of the first embodiment and the procedures of the above-mentioned first and third embodiments in similar manners; thus the descriptions associated therewith will be omitted. Additionally, steps in FIG. 15 that are identical or equivalent to the steps shown in FIG. 10 are referenced by the same reference marks, and will not be described in this description.

In FIG. 15, first, the step S21, the step S2 to the step S4 shown in FIG. 10 are performed. Thereafter, the system control unit 20c judges whether or not the system control unit 20c has caused the clock synthesizer 32c and the servo circuit 5 to decrease the speed of recording data to the optical disk 2 (step S61). When the system control unit 20c has not caused the clock synthesizer 32c and the servo circuit 5 to decrease the speed of recording (NO), the step S5, the step S22 and the step S23 shown in FIG. 10 are performed. Subsequently, the system control unit 20c orders the clock synthesizer 32c and the servo circuit 5 to decrease the speed of recording data to the optical disk 2. Thereafter, the procedure returns to the step S21 (step S62). On the other hand, when the system control unit 20c is judged to have caused the clock synthesizer 32c and the servo circuit 5 to decrease the speed of recording (YES), the procedure transits to the step S10 regardless of a judgment result in the step S22. Then, in the step S10 and the step S11, the EFM output timing control unit 22 starts recording data from the aimed starting position of recording the data on the optical disk 2, and the procedure in this flowchart ends.

As described above, in the optical disk device according to the present fourth embodiment, when the displacement α is judged to surpass the threshold value THa in the step S22, the system control unit 20c causes the clock synthesizer 32c and the servo circuit 5 to decrease the speed of recording data to the optical disk 2. Thereafter, the system control unit 20c performs the series of the recording control again so as to record the data to the optical disk 2. The decreased speed of the recording lengthens a period during which to deal with the one set of data transferred from the host computer (HC), i.e., a period from the start of the recording on the optical disk 2 to the end of the recording. This lengthened period can increase the probability of absorbing (adjusting and stabilizing) the displacement α in the motor revolution control so as to prevent the occurrence of a displacement beforehand.

The present invention is not limited to the specifically disclosed embodiments, and variations and modifications may be made without departing from the scope of the present invention.

The present application is based on Japanese priority application No. 2000-236898 filed on Aug. 4, 2000, the entire contents of which are hereby incorporated by reference.

What is claimed is:

1. An optical disk data-writing method comprising the steps of:
  (a) generating a data-writing reference clock signal used to obtain a data-writing timing upon recording data to the optical disk;
  (b) generating a predetermined sector synchronizing signal from said data-writing reference clock signal;
  (c) reading address information indicating a position on the optical disk from data recorded on the optical disk so as to demodulate the address information into a predetermined synchronizing signal;
  (d) detecting a displacement between a phase of said sector synchronizing signal and a phase of said synchronizing signal; and
  (e) controlling a data-writing upon performing an additional recording to the optical disk by controlling a revolution of the optical disk dynamically according to said displacement.

2. The method as claimed in claim 1, further comprising increasing a servo response dynamically to a motor revolving the optical disk, when said displacement surpasses a predetermined value.

3. The optical disk method as claimed in claim 2, further comprising decreasing said increased servo response back to a previous degree thereof, when said displacement becomes lower than a predetermined reference value.

4. The optical disk method as claimed in claim 2, further comprising decreasing said increased servo response back to a previous degree thereof, when a predetermined period has elapsed since said servo response was increased in step (e).

5. The optical disk method as claimed in claim 2, further comprising decreasing said increased servo response back to the previous degree thereof, when a predetermined amount of data has been recorded to the optical disk since said servo response was increased in step (e).

6. The optical disk method as claimed in claim 1, further comprising increasing a servo response dynamically to a motor revolving the optical disk, when said displacement surpasses the displacement detected last time by step (d).

7. The optical disk method as claimed in claim 6, further comprising decreasing said increased servo response back to a previous degree thereof, when said displacement becomes lower than a predetermined reference value.

8. The optical disk method as claimed in claim 6, further comprising decreasing said increased servo response back to a previous degree thereof, when a predetermined period has elapsed since said servo response was increased in step (e).

9. The optical disk method as claimed in claim 6, further comprising decreasing said increased servo response back to the previous degree thereof, when a predetermined amount of data has been recorded to the optical disk since said servo response was increased in step (e).

10. An optical disk method recording information on a recordable optical disk including address information indicating a position of a part of the optical disk having not recorded any data yet, and reproducing information from the optical disk, the method comprising:
  a reference clock signal generating step generating a data-writing reference clock signal used to obtain a data-writing timing upon recording data to the optical disk;
  a synchronizing signal generating step generating a predetermined sector synchronizing signal from said data-writing reference clock signal;
  a data demodulating step reading address information indicating a position on the optical disk from data recorded on the optical disk so as to demodulate the address information into a predetermined synchronizing signal;
  a displacement detecting step detecting a displacement between a phase of said sector synchronizing signal and a phase of said synchronizing signal; and
  a data-writing control step controlling a data-writing upon performing an additional recording to the optical disk by controlling a speed of writing data to the optical disk according to said displacement.

11. The optical disk method as claimed in claim 10, further comprising performing the displacement detecting step again after decreasing said speed, when said displacement surpasses a predetermined value.

12. The optical disk method as claimed in claim 11, wherein said data-writing control step starts the additional recording to the optical disk, when said displacement becomes lower than a predetermined reference value.

13. The optical disk method as claimed in claim 10, further comprising performing the displacement detecting step again after decreasing said speed, when said displacement surpasses the displacement detected last time by said displacement detecting step.

14. The optical disk method as claimed in claim 13, wherein said data-writing control step starts the additional recording to the optical disk, when said displacement becomes lower than a predetermined reference value.

* * * * *